United States Patent [19]

Freeman

[11] Patent Number: 5,340,317

[45] Date of Patent: * Aug. 23, 1994

[54] REAL-TIME INTERACTIVE CONVERSATIONAL APPARATUS

[76] Inventor: Michael J. Freeman, Suite 2401, 1270 Avenue of the Americas, New York, N.Y. 10020

[*] Notice: The portion of the term of this patent subsequent to May 25, 2010 has been disclaimed.

[21] Appl. No.: 927,113

[22] Filed: Aug. 7, 1992

Related U.S. Application Data

[63] Continuation-in-part of Ser. No. 727,836, Jul. 9, 1991, Pat. No. 5,313,510.

[51] Int. Cl.⁵ .............................................. G09B 7/06
[52] U.S. Cl. .................................... 434/321; 434/319
[58] Field of Search ............... 434/307, 308, 309, 318, 434/319, 321, 322, 323, 335; 273/436; 446/297, 299, 302

[56] References Cited

U.S. PATENT DOCUMENTS

| | | | |
|---|---|---|---|
| 3,735,503 | 5/1973 | Dow et al. | 434/321 |
| 3,947,972 | 4/1976 | Freeman | 434/321 |
| 4,078,316 | 3/1978 | Freeman | 434/319 |
| 4,117,605 | 10/1978 | Kurland et al. | 434/319 |
| 4,170,832 | 10/1979 | Zimmerman | 434/323 |
| 4,445,187 | 4/1984 | Best | 434/307 |
| 4,571,640 | 2/1986 | Baer | 434/307 |
| 4,591,248 | 5/1986 | Freeman | 434/323 |
| 4,753,597 | 6/1988 | Pash et al. | 434/318 |
| 4,847,699 | 7/1989 | Freeman | 434/307 |
| 5,213,510 | 5/1993 | Freeman | 434/319 |

OTHER PUBLICATIONS

Usami, Shozo, "Parallel Random Access System: A New Method to Improve Foreign Language Training", Educational Technology, Feb. 1979, pp. 33–35.

*Primary Examiner*—Jessica J. Harrison
*Attorney, Agent, or Firm*—David M. Klein; Bryan Cave

[57] ABSTRACT

The present invention is a real-time interactive conversational apparatus which operates by playing to a child a prerecorded conversation stored on a multi-track media such as magnetic tape. The system conversations are programmed according to a decision-tree logic which allows complex conversations to be developed, branching between the various tracks of the media being accomplished without the aid of a microprocessor or any coding in the conversation source signal. The information is stored on each track in a plurality of reproducible information segments, which contain interrogatory messages and associated multiple choice responses, responsive messages, informational messages, and combinations thereof. The responsive messages contained on the tracks are related in real-time and content to particular interrogatory messages, and correspond with multiple choice selectable responses. The apparatus can exhibit pseudo-memory and multiple simultaneous pseudo-memories; exhibit profiling and substitutability; and categorize and subcategorize users of the apparatus. The media used by the apparatus are removable so as to allow user selection of cartridges containing differing conversational content.

18 Claims, 4 Drawing Sheets

REAL-TIME INTERACTIVE CONVERSATIONAL APPARATUS

CROSS-REFERENCE TO RELATED APPLICATION

This application is a continuation-in-part of my prior U.S. patent application Ser. No. 727,836, filed Jul. 9, 1991, U.S. Pat. No. 5,213,510 entitled "Real-Time Interactive Conversational Toy."

BACKGROUND OF THE INVENTION

1. Field of the Invention

The present invention relates generally to interactive systems, and more particularly to a real-time interactive conversational apparatus which exhibits pseudo-memory of conversation responses for an improved dialogue complexity and more realistic conversational performance.

2. Description of the Prior Art

Systems which perform interactive conversation are well known in the art. These systems have used a variety of different techniques to achieve interactive conversation, and have ordinarily had limited success at conversations which were more than mere simple question and answer sessions.

For example, commonly owned, U.S. Pat. Nos. 3,947,972 and 4,078,316 disclose a conversational teaching apparatus which employs a time synchronized multi-track audio tape to store the educational conversation messages. It employs one track to relay educational interrogatories to a user, and the remainder of the tracks, selectable by a switching mechanism, are used to convey responsive messages.

Other multiple choice child response systems are exemplified by the systems disclosed in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example.

Various interactive television systems have also been developed For example, commonly owned U.S. Pat. No. 4,264,925 discloses an interactive cable television system. This system permits computer based memory of user input responses over time, and requires a very complex and expensive apparatus to operate. other examples of interactive conversation utilizing television may be found in U.S. Pat. Nos. 4,602,279; 4,847,700; and 4,264,924, for example. Generally, these systems require a separate microprocessor to perform memory functions, they require coding and decoding of the transmitted signal in order to be utilized, and allow little flexibility to select the content of the interactive conversations, since the conversation signal is broadcast separately from outside of the control of the user.

Flexibility and memory-like characteristics are desirable elements for an interactive toy system to participate in a complex interactive conversation. None of these prior art systems have been able to provide real-time interactive conversation in a toy, where the conversation complexity and teaching effectiveness can vary with the individualized past responses of the child. Further, without a separate microprocessor, prior systems have been generally unable to exhibit the memory-like characteristics which are necessary for a realistic interactive conversation. Those which do provide memory, do so in only the most minimal fashion, i.e. recalling particular facts, but unable to integrate these facts into the course of conversation.

Prior conversational devices are generally impractical for utilization as toys for children. Those systems which operate on magnetic tapes offer little conversational complexity because they are generally restricted to keeping interrogatories and responses together as a unit and do not enable compiling or accumulation of many interrogatories and responses. They are not interactive enough to retain the long-term motivational and educational interests of a child, and are therefore not the most effective learning tools. Cable and broadcast television systems ordinarily require very complex and expensive apparatus and a number of dedicated television signals to operate. Since the media used for transmitting the conversation is out of the control of the user (i.e. the program is shown at a scheduled time), rather than one which is removable and replaceable, the cable systems also offer little user flexibility in the content and scheduling of interactive conversation available to participate in.

These disadvantages of the prior art are overcome by the present invention.

SUMMARY OF THE INVENTION

The present invention is a real-time interactive conversational apparatus which operates by playing to a child a prerecorded conversation stored on a multi-track media such as magnetic tape. Contained on the various tracks of the media are a series of related questions, answers and informative messages which are recorded in a presynchronized manner. In response to questions, the child switches between the tracks of the tape by activating a multiple choice switch which corresponds with the multiple choice responses to the question. The track selected will contain a message corresponding in context with the child's multiple choice response to the interrogatories. Thus, the system of the present invention appears to be conversing with the child by asking questions, and then by apparently fostering discussion based upon the responses by the child.

The system may ask information gathering questions, such as age, sex, locality, and use this information to categorize the child. The system of the present invention may then engage the child in conversation with messages related to the child's category. The system can further subcategorize children, i.e. boy under 5 years old, and provide the subcategories each with real-time interactive conversation related to the subcategories. The flexibility of the system is limited only by the number of tracks available. By altering the content of the machine-child conversation in response to conversational inputs of child, the machine actually exhibits memory and is participating in the conversation, and therefore provides a more realistic, enjoyable and effective learning experience. Because of the combinations that can be afforded by this invention, a child who, for example, answers 10 questions in a row (producing 10,000 possible outcomes) can receive individualized reinforcement. For example, there was only one possible correct sets out of potentially 10,000 which the apparatus identifies as correct and advises the child of these correct choices. The apparatus can also advise the child of the details of the correct responses by repeating the correct responses that the child made.

The system conversations are programmed according to a decision-tree logic which allows very complex conversations to be developed, all within the confines of a multi-track media, and without the aid of a microprocessor or any coding in the conversation source signal to control branching. As indicated above, the machine can engage in conversation particularly suited for a child based upon responses to informational questions. The system can also track trends in the child's performance in answering questions, and then provide reinforcement or encouragement to the child. Also in response to trends in the child's performance, the machine can ask easier or more difficult questions as necessary. All of the logic to perform these functions is determined in advance by the decision tree and recorded onto the entirely passive media.

By appropriate decision-tree design, the system can provide customized conversation to each of more than one child at a time. Each child may receive an individualized conversational response depending on the multiple choice selection made by the child in response to questions.

The interactive toy of the present invention comprises a multitrack storage media, preferably magnetic, having a plurality of synchronized coextensive tracks capable of storing the conversational content. The system also includes a multi-track playback means, for simultaneously reproducing the stored information from each of the tracks; a multiple choice selection means, such as magnetic proximity switches, or conventional push button switches, operatively connected to the playback means for directly selecting one of the tracks and playing back its stored information; and audio output means, such as a conventional loudspeaker or earphones, operatively connected to the playback means for producing as an output the track information selected by the multiple choice switching means. By including a plurality of multiple choice selection means, one per child, connected in parallel to the common playback means with each selection means having an associated output device, such as earphones, the system may be configured for use by a large number of children simultaneously, different children participating in individually tailored conversations simultaneously.

In operation, the multi-track storage media, which contains a conversational content as described below, has all of its tracks played back simultaneously by the playback means. In response to questions having multiple choice responses associated with particular tracks, a child will switch the multiple choice selection means to a particular track associated with the selection, thereby directing the information on the selected track to the output means. Thus, only a single selected channel will be output at a given time, the content of which is the interactive conversation.

The information is stored on each track in a plurality of reproducible information segments, each of which comprises a complete message reproducible by the playback head directly in response to the selection of the track upon which the segments are stored. Each of the information segments on the tracks contain interrogatory messages and associated multiple choice responses, responsive messages, informational messages, and combinations thereof. Each of the tracks are preferably of the same width. The responsive messages contained on the tracks are related in real-time and content to particular interrogatory messages, and correspond to the multiple choice selectable responses.

The media used by the toy of the present invention are removable by the user so as to allow user selection of cartridges containing differing conversational content to be removably inserted into the playback means. This feature permits the apparatus great flexibility by allowing a wide variety of conversations to be stored on a library of tapes for use by children. A variety of conversations will retain the long term interest of children, and increase the educational value of the present invention. The labels on the multiple choice selection buttons may also be changed and the system may be used in conjunction with an associated book containing pictures or text. These features add to the variety of uses which the system of the present invention may be used for.

The decision-tree architecture of the present invention allows complex, well-timed, cumulative conversations to be implemented on the storage media. Each track, at discrete times, is represented as a node on the tree, consecutive nodes representing a single track at different ordered times throughout the program. Parallel nodes represent the various tracks at each particular time. Branches on the tree represent the multiple choice selections to interrogatories which would cause the different tracks to be read, and require messages on the selected track to contain messages related to the particular multiple choice selection.

The decision-tree logic permits a visual verification of conversational parameters, to properly synchronize the interrelationships between successive segments of conversation, and to assure logical continuity between these segments. By seamlessly crossing between parallel tracks of predetermined conversation in response to multiple choice inputs, the system appears to be engaged in an actual conversation with the child. By appropriate design the system can exhibit pseudo-memory; exhibit multiple simultaneous pseudo-memories, carry the various memories throughout the program; engage in interactive conversations related to the content of the various pseudo-memories; categorize and subcategorize users of the apparatus and engage in particularized conversations within the various categories can give reinforcing or encouraging messages in response to correct and incorrect answers; can correct children who did not follow instructions properly; do mathematics; make subsequent questions easier or more difficult in response to correct and incorrect answers; identify subject areas in which the child needs improvement and provide conversation accordingly, and many other possible alternatives.

The system of the present invention provides a more comprehensive interactive conversational apparatus than previously possible. Prior art designs of similar simplicity were incapable of conversations having the many features of the conversations of the present invention, especially tailored responses, long-term memory functions, cumulative memory functions, profiling, substitutability, and removable, replaceable media. The decision-tree design of the toy of the present invention makes the system directly responsive to conversational responses by the child, giving the child a more realistic impression that interactive conversation is occurring, and therefore improving its utility as a toy, teaching aid, or other conversational apparatus.

DESCRIPTION OF THE PREFERRED EMBODIMENT

Figure 1:
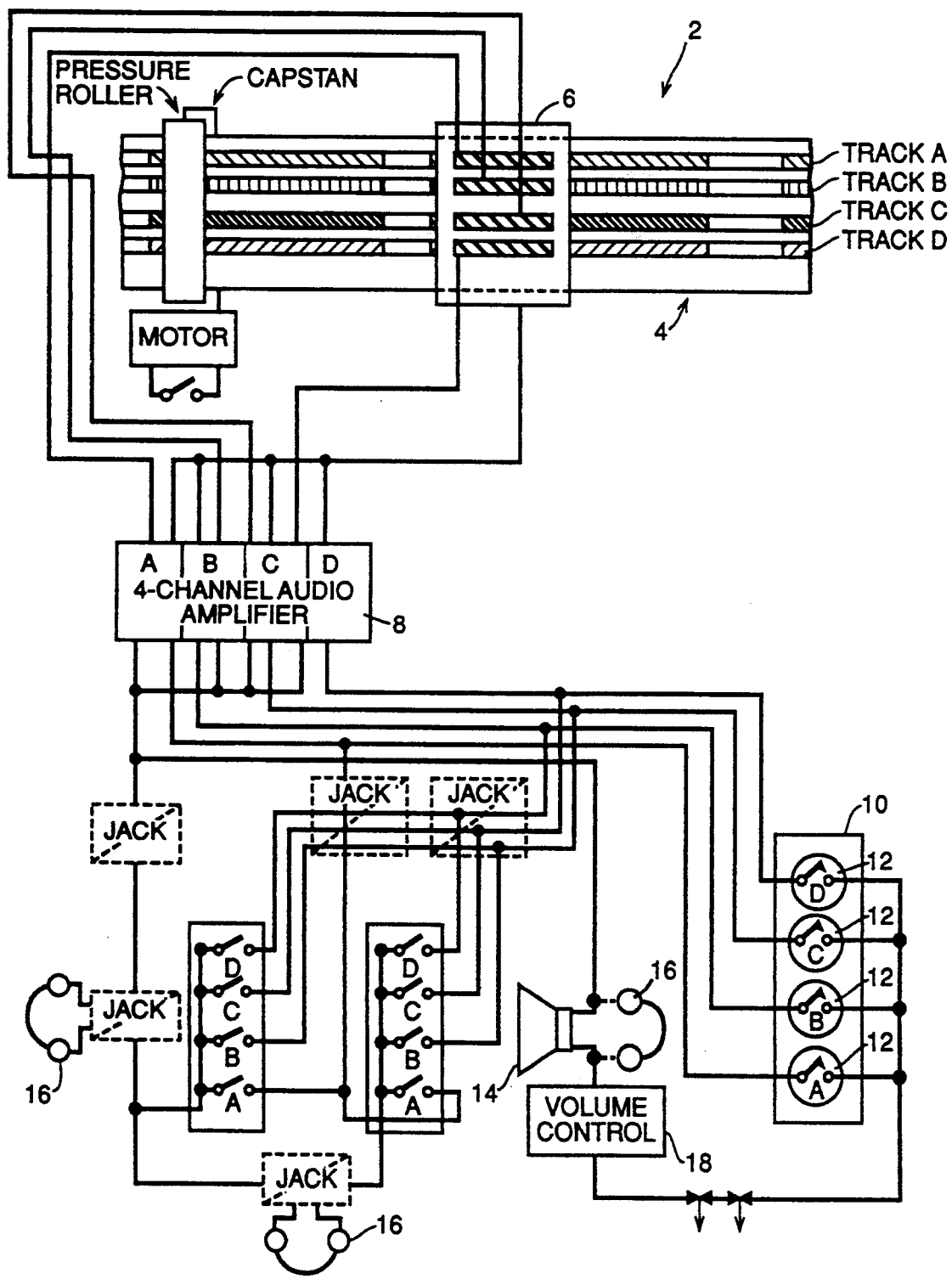
FIG. 1 is a diagrammatic illustration, partially in schematic, of the selection and playback portions of the interactive conversational toy of the present invention.

Referring now to the drawings in detail, and initially to FIG. 1, the mechanism of the real-time interactive conversational apparatus of the present invention is generally similar to that disclosed in commonly owned U.S. Pat. No. 3,947,972. A conventional multi-track magnetic tape player 2 is utilized for retrieving audio information from a multi-track magnetic storage media 4 via multi-track playback head 6.

The playback head 6 is preferably connected in conventional fashion to a conventional four channel audio amplifier 8, having one channel for each of the respective four tracks, A, B, C, D of multi-track tape 4 so as to conventionally play back the information stored on the respective audio tracks. Playback head 6 is preferably a conventional 4 channel audio playback head, with preferably equal head widths for each of the respective tracks A, B, C, D. If desired, four-channel amplifier 8 can be replaced with a single channel amplifier which is switched to amplify the actual track selected at any given time.

The output of audio amplifier 8 is preferably connected to a multiple choice selection device 10 which preferably comprises a plurality of conventional switches 12, with one switch being provided per track of multi-track tape 4. Each of these switches 12 is conventionally connected to the appropriate channel output of audio amplifier 8. The switches 12 are preferably conventional mechanical, magnetic or electronic switches which are equipped with an interlock so that only one switch may be depressed or activated at one time. Switches 12 are preferably connected between the output of the audio amplifier 8 and a conventional audio output device, such as a conventional speaker 14, or a conventional pair of earphones 16 through a conventional volume control 18, the other terminal of the audio output device 14 or 16 being connected to the audio amplifier 8 to complete the circuit. Thus, when one of switches 12 is closed, the output of the corresponding audio track A, B, C or D, all of which are being provided to audio amplifier 8 by multi-track playback head 6, is selectively provided to the audio output device 14 or 16 to be heard by the child. Accordingly, as described in greater detail hereinafter, if interrogatory messages, such as true/false or multiple choice questions with information instructions to the child to select the appropriate responsive message track A, B, C, or D are contained on any of the tracks A, B, C, or D of multi-track tape 4, and the student determines that track D contains the correct answer, he then actuates the switch 12 corresponding with track D to complete the circuit between the D channel of audio amplifier 8 and the audio output device 14 or 16 and he will receive the audio response messages contained on track D. If desired, the present invention may be simultaneously utilized by a plurality of children if configured as disclosed in commonly owned U.S. Pat. No. 3,947,972.

The multi-track tape 4 is preferably removable from the playback means 2 so that different multi-track tapes 4 having different interactive conversations stored thereon may be inserted and used in the toy of the present invention. This makes it possible to record a library of prerecorded media, covering a wide array of topics. For example, as described below, the media might contain mathematics problems at different levels, multiple choice trivia questions, learning exercises, or even interactive story telling. The removable media are preferably multi-track magnetic tape cartridges, but may be any removable multi-track media such as, for example, magnetic disk, optical disk, or other media appropriate for the present application. These removable multi-track tapes should preferably be contained in rigid cartridges for convenient removal and replacement.

The apparatus of the present invention may comprise other embodiments. Rather than utilizing a multi-track magnetic tape, without any microprocessor, the system might use any appropriate data storage means for containing the various conversational messages employed by the system, provided that the information stored thereon may be separated into tracks. For example, a conventional magnetic disk, CD or other optical disk, or even hardware, such as a ROM or EPROM, could be used to store the information. The information data could be physically stored on individual disk tracks, or the data could be organized so that each track of information is randomly accessible as separable files on the disk. In conjunction with a disk reader appropriate for the type of disk drive in use, the information stored on the disk as individual conversational tracks could be output to a user of the system in near real-time fashion.

In practice, in such an instance, it would be advantageous for a microprocessor to be provided for the purpose of first reading the various tracks into a memory cache, which would allow faster access to the conversational information. Thus, during operation in this instance, the microprocessor would read the serial track information from the disk into parallel tracks in cache memory in advance, while substantially simultaneously reading the track data from cache to memory to an output device. As the cache memory were depleted, it would be refilled from disk by the processor. The microprocessor would only be used in this instance to control the various peripheral devices of the system, i.e. the multiple choice selection means, disk access, video output. As hereinafter described, the present invention exhibits a pseudo-memory during the interactive conversations. The microprocessor in the above example, is not used to perform any of the logical memory functions within a conversation, but rather these are achieved as in the previous embodiment by the unique techniques for storage information on the multi-track storage media as described below.

Output to the user could be by various devices, depending on the type of media used. For example, if the stored conversations on the multi-track media were in digital form, i.e. CD-ROM, magnetic disc, DAT, the processor or other means could convert the digital information streams to analog signals for output to conventional headphones. Alternatively, the conversational stream could contain video as well as audio signals. The computer would therefore generate the appropriate video and audio signals. It is anticipated that the interactive toy system of the present invention could employ a large variety of multi-media inputs and outputs as such technologies develop. It is further anticipated that any storage means capable of storing and substantially simultaneously retrieving conversational data could be employed by the present invention. What-ever multi-track device is employed, it should preferably contain one track for each of the number of tracks to be used in the interactive conversation. In a preferred embodiment, four equal bandwidth tracks are used. As described below, it may be advantageous to utilize a larger number of tracks to obtain more complex conversations and to exhibit more sophisticated memory type functions.

Multiple choice input may be provided by any appropriate device to select a channel of the conversation for output. If a microprocessor and computer were in use, the multiple choice inputs could be provided via a keyboard or even a touch screen that interrupts to the processor. The selected channel would then be routed to the output device in use. For example, a conventional computer could be used for the present invention. The information streams might be interlaced video and audio signals, the multiple choice input might be the keys on the keyboard, and output would be simultaneous to the monitor and audio amplifier.

If it were desired that the system be usable by only one child at a time, the four channel audio amplifier could be replaced by a conventional one channel amplifier which amplifies only the one selected channel. As described below, it might also be desired to allow more than one multiple choice selection button to be pressed at one time to allow mixing of the information on the various channels. Such an embodiment would, for example, allow the apparatus of the present invention to create different variations of a piece of music in response to various multiple choice selections of the child.

The information is stored on each track in a plurality of reproducible information segments, each of which comprises a complete message reproducible by the playback head directly in response to the selection of the track upon which the segments are stored. Each of the information segments on the various tracks contain interrogatory messages with associated multiple choice responses, responsive messages, informational messages, or combinations thereof. The messages contained on the various tracks of the multi-track media may include responsive messages, informational messages, interrogatory messages or combination thereof whose contents are related in real-time to particular interrogatory messages, and correspond to the multiple choice selectable responses to the particular interrogatory messages.

The various information segments on the various tracks relate in real-time and content so that an interactive conversation can occur as the media is played back and the child responds to the various interrogatories on the tracks. As a child answers a particular interrogatory with a multiple choice response, the information on the track associated with the particular selection is routed to the output device. On the selected track at the time at which the selection occurred, is an information segment whose content corresponds with the selected response to the previous interrogatory, whether or not the interrogatory was on the same track as the information segment being output. The various interrogatories, responsive messages, and informational messages may generally be contained on any or all of the various tracks provided that they are synchronized properly so as to retain a timed relationship, and correspond properly with logic of the decision-tree as defined hereinafter.

In order to understand the real-time conversational responsive environment of the present invention, and to compare it to prior systems of limited conversational complexity, several sample real-time interactive conversations are illustrated below.

Example 1 illustrates an interactive conversation which will give a child a reward if three questions in a row are answered correctly. In this example, a four channel media is used, and the multiple choice response buttons would be labelled "A", "B", "C", "D" corresponding with the four channels 1, 2, 3 and 4. Thus, if multiple choice selection "C" were made, the contents of channel 3 would be output to the output device. By using a combination of "generic wrongs" whose answers cannot be traced back to a particular response, and by limiting the number of directed choices, it is possible to control the sequence of questions in such a way as to address the child who answers all three questions correctly. At the conclusion of the first question, every response is specific, and may be traced to a particular response. None of the answers is generic. At the conclusion of the second question, the answers are both specific and have perfect memory of the results of first two questions. After the final question, three of the branches are generic wrongs, and one branch, channel 4 is reserved for the child who answered all three questions correctly. This logic could be extended to encompass four or more correct answers. Theoretically, it is limited only by the amount of available storage media.

EXAMPLE 1

| CHANNEL 1 "A" | CHANNEL 2 "B" | CHANNEL 3 "C" | CHANNEL 4 "D" |
|---|---|---|---|
| I will now ask you 3 animal questions in a row. If you answer all 3 questions correctly, I'll tell you a joke Here we go . . . What animal can make no sound at all? Press "A" for chicken, "B" for horse, "C" for giraffe, and "D" for tiger. Press now! SELECTION TIME No, a chicken does make a sound, and it sounds like this: (SFX). The answer was giraffe. Question #2 is a true/false question: True or false - a penguin has wings but can not fly. | Same as Channel 1. SELECTION TIME No, a horse does make a sound, and it sounds like this: (SFX). The answer was giraffe. Question #2 is a true/false question: True or false - a penguin has wings but can not fly. Press "A" | Same as Channel 1. SELECTION TIME Yes, you have pressed the correct button. Congratulations. A giraffe makes no sound. Good work. Question #2 is a true/false question: True or false - a penguin has wings but | Same as Channel 1 SELECTION TIME No, a tiger does make a sound, and it sounds like this: (SFX). The answer was graffe. Question #2 is a true/false question: True or false - A penguin has wings but can not fly. Press "A" |

EXAMPLE 1-continued

| CHANNEL 1 "A" | CHANNEL 2 "B" | CHANNEL 3 "C" | CHANNEL 4 "D" |
|---|---|---|---|
| Press "A" for true, and "B" for false. Do it now. | for true, and "B" for false. Do it now, if you would. | can not fly. Press "C" for true and "D" for false. Do it now, if you would. | for true and "B" for false. Do it now, if you would. |
| SELECTION TIME I see you had trouble on this question, also. What a shame. Believe it or not, the statement I made earlier is true. Penguins can't fly. | SELECTION TIME You did better on this second question. Your brain is starting to function well. It is true. Penguins can't fly. | SELECTION TIME You didn't do as well on this second question. The statement was true. Penguins can not fly. They do not even try. They know they'd just fall down. | SELECTION TIME I am very impressed. You are right, and have answered 2 questions in a row correctly. One more correct answer and I'll give you a joke. |
| Here is your third and final question: What is the largest mammal? Press "A" for elephant, and "B" for a whale. Press now! | Same as Channel 1. | Same as Channel 1 | Here is your third and final question: What is the largest mammal? Press "C" for elephant, and "D" for a whale. Press now! |
| SELECTION TIME I'm sorry, but the answer was a whale, not an elephant. You did not get three questions in a row right, so you do not get a joke. Better luck next time. That last questions was tricky, because many people think whales are fish, because they live in the water. But whales are mammals. (END) | SELECTION TIME You are correct, the answer is a whale. That is a very good answer, as most people forget that whales are mammals. Unfortunately, though, you did not get all three questions right, so you do not get a joke. I am sorry, but rules are rules. (END) | SELECTION TIME I'm sorry, but the answer was whale, not an elephant. It is too bad that you got this third question wrong after answering the first two animal questions correctly. I am afraid I can not tell you the joke, even though two out of three is not bad. (END) | SELECTION TIME This is truly amazing: (SFX). You are right and not only that, you've answered all 3 animal questions correctly, so here is your joke: What happened to the duck who flew upside down? He quacked up! (Laughter) then he ate some cheese and quackers. (Laughter). (END) |

While it appears to the child that the system is remembering the previous answers, the memory in use is more properly termed a pseudo-memory because nothing is actually being stored in memory. Rather, the branching logic used to develop the conversation included a logical pathway reserved for no incorrect answers. Therefore, messages along the pathway correspond in content with the fact that no incorrect answers were given. As long as the child's responses to the series of interrogatories corresponded with the reserved pathway, messages with a content that appeared to contain memory were played back.

A decision-tree is used to determine the proper logical relation between the various tracks and the various information segments contained thereon in order to implement pseudo-memory and other features which provide conversation complexity, and to assure proper timing and synchronization of the information. The decision-tree is a visual and logical representation of a complex conversation whereby it is possible to trace branching from track-to-track in response to interrogatories, and it is easier to provide customized messages to certain children responsive to the content of their responses to certain questions.

Figure 2:
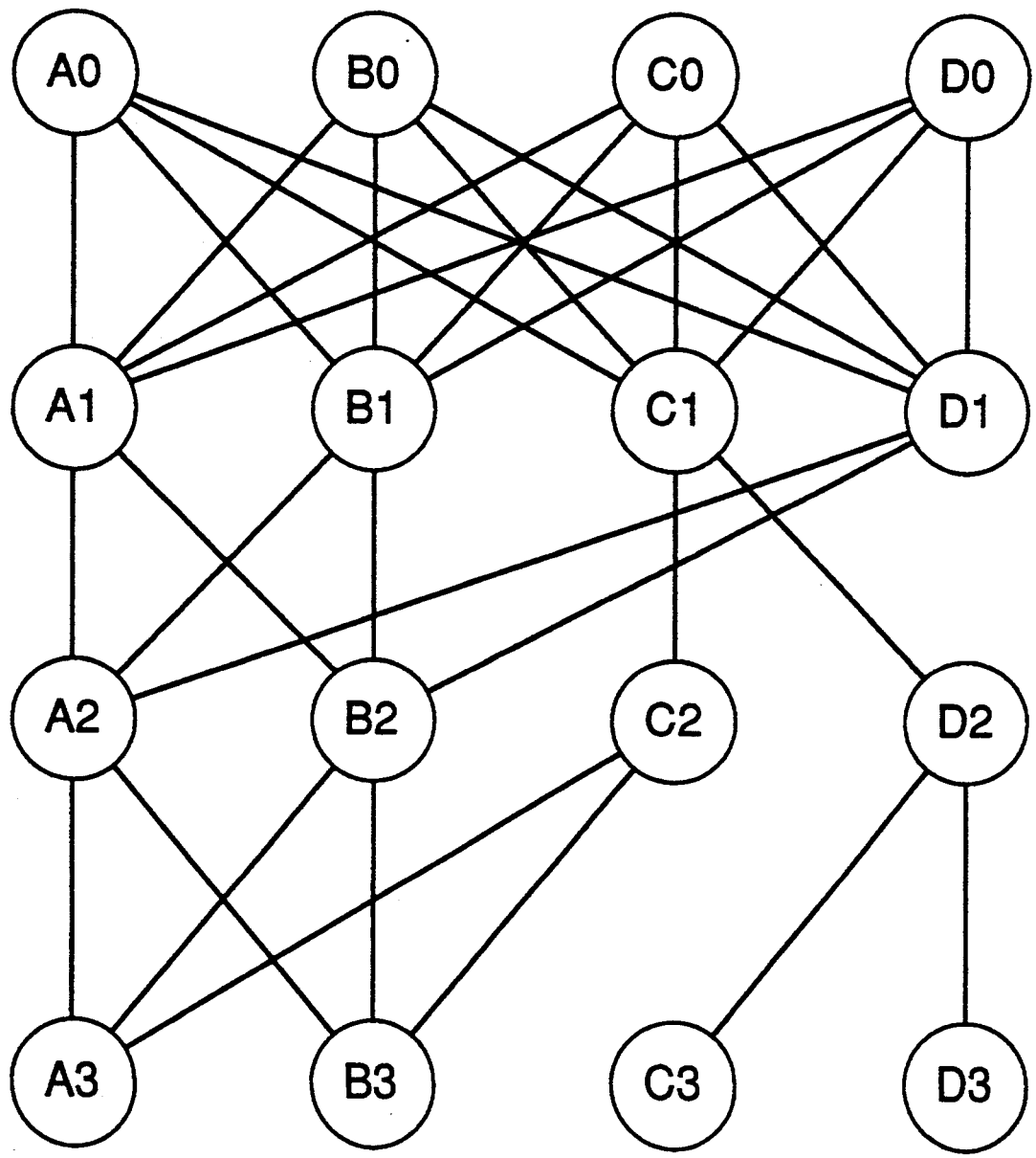
FIG. 2 is an illustration of the decision-tree corresponding with example 1.

Indicated in FIG. 2 is the decision-tree corresponding with example 1. The decision-tree contains a representation of each track at particular branch points during the course of a conversation. A branch point is ordinarily a time during the playing of the tape at which the child is asked to make a multiple choice selection. In example 1, branch points correspond with the segments reading "SELECTION TIME."

Each node on the tree represents the information segment on a particular track between branch points. Four nodes, A, B, C, D, are shown at each level, corresponding to the four tracks used in the example. Each node is represented at each branch point, the branches on the tree representing the multiple choice selections for each particular interrogatory. Each discrete time frame containing a different information segment is a different level on the tree. Each track contains successive nodes corresponding to the successive information segments of the conversation. The decision-tree is a useful visual tool for assuring proper synchronization of messages across the various tracks over time, as well as being a useful tool for assuring logical continuity. As will be further illustrated in other examples, use of the decision-tree and the special logical pathways can enable a pseudo-memory to be provided for the entire length of a complete interactive scenario, such as by requiring a child to answer 12 questions in a row correctly in order to go on to the next aspect of the extended complete scenario, such as by separating the users into two categories; namely, all correct and everything else. Moreover, code words may be used which are associated with certain tracks so that, at a subsequent time, the child can use its knowledge of the code word to make a choice which is dependent thereon, thereby providing what appears to be a long term memory capability. Apart from these examples of "memory" functions, other features of the present invention will be illustrated below in the following examples.

Figure 3:
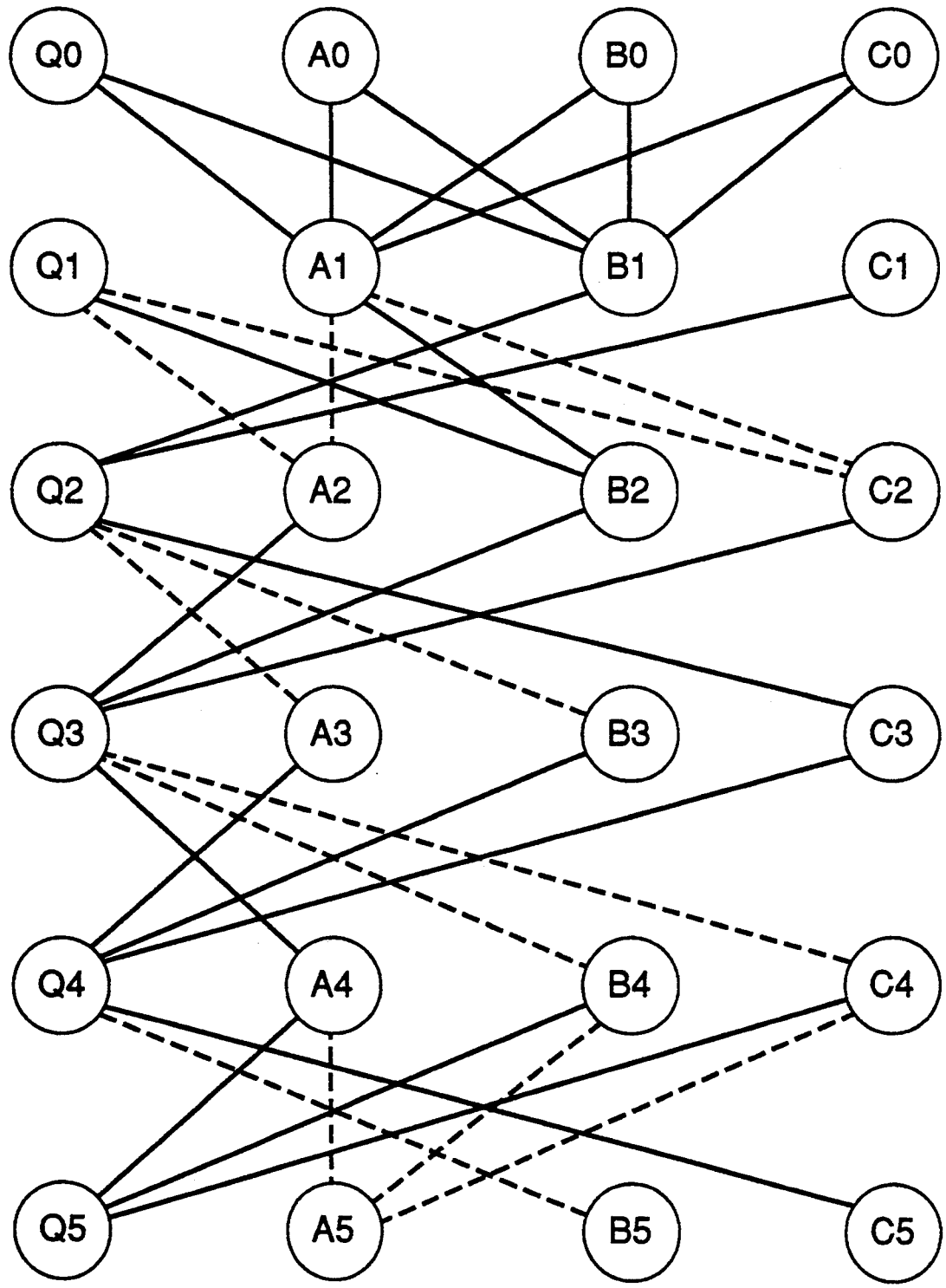
FIG. 3 is an illustration of the decision-tree corresponding with example 2.

Referring now to FIG. 3, four nodes A, B, C, D are shown at each level corresponding to the four tracks in the preferred embodiment. Each node is representative of the message contained on the corresponding track at the discrete time represented by the level number. Level 0 would represent the first message on each track, with subsequent levels 1, 2, and 3 representative of subsequently ordered frames. Each level of frames on the various tracks must be timed to begin and end at approximately the same time. If one frame were longer in time than others, it would be necessary to fill the gap in the remaining branches with filler messages. Filler messages may take any appropriate form, which may include music, a message telling the child to "Please Wait", or even a temporary quiet in the conversation. Not every track need have a branch point at the same time. Therefore it is possible that only a portion of the nodes will branch at a particular time.

The various branches from each node represent the possible selection choices offered to the child. Thus node A0 has branches to nodes A1, B1, C1, and D1 which correspond to the choices offered in example 1, channel 1, first message. In this example, choice C contains the correct response, therefore node C1 may include encouraging messages appropriate for a correct response. This node might also include a more difficult second question. Nodes A, B, and D, which represent incorrect answers might include encouraging messages, and perhaps easier questions. Messages such as given by example 1, second frame are indicative of such preferred language.

Since example 1 demonstrates use of the apparatus of the present invention for giving a child a reward for correctly answering 3 questions in a row, it becomes clear that only node C1 is on that pathway at level 1. Since there are only four nodes, the second question may only have two choices if separate pathways are to be maintained for persons who have only answered questions correctly and those with errors. Therefore, at level 2, nodes A and B are used for those children with incorrect answers, wrongs, and nodes C and D are reserved for child who answered the first question correctly. These nodes correspond with the multiple choices given to children in example 1, Frame 2. At level 3, only node D is reserved for children with no wrongs. Nodes A, B, and C remain reserved for children in the other category. By tracing the progression of the branches down the tree, all possible outcomes of a series of questions may be determined, and informational messages and responsive messages appropriate for their context may be recorded.

Any ordinary branches or series of consecutive branches are termed a pathway. Special pathways are used to distinguish series of branches which represent particular responses to particular interrogatories, and therefore contain at least one piece of pseudo-memory. Nodes on the special pathway might contain information demonstrating memory-like functions if desired. For FIG. 2, a special pathway exists along the path between nodes C1 - D2 - D3, since these exhibit full path recall. Other nodes exhibit certain recall functions as well. Node A2 can recall two wrong answers, but not the precise pathway, while node B2 corresponds with a wrong followed by a right answer, with no recallable pathway.

For example, if a point on the tapes corresponding to node B2 were to be played, this would indicate that the child received one incorrect answer followed by a correct one. Thus a message stressing improvement might be played. Since node A2 corresponds with two incorrect answers, words of encouragement might be recorded at this node. If desired, and if tracks were available, it might be desirable to provide persons at this node with easier questions.

The decision-tree provides a highly efficient method for planning complex conversations. The complexity of conversations which utilize multiple choice interrogatories is limited only by the number of tracks available. Once a piece of information is stored in the pseudo-memory, it requires only one channel to remain fully recallable. To then ask questions while maintaining the information will require a number of channels corresponding to the number of multiple choice selections to be made available. When no interrogatories are being given, each memory requires only one channel.

Example 2 demonstrates use of the system of the present invention for categorizing children based upon a response to a particular interrogatory, then providing the each category with independent tailored interactive conversation. In this example, the children are categorized by age, with children under 5 participating in an interactive conversation tailored for their age group, and children over 5 participating in a completely separate conversation.

EXAMPLE 2

| CHANNEL 1 "QUESTION" | CHANNEL 2 "A" | CHANNEL 3 "B" | CHANNEL 4 "C" |
|---|---|---|---|
| If you are under 5 years old, press A; if your are 5 years old or older, press button B. Press now | Same as Channel 1 | Same as Channel 1 | Same as Channel 1 |
| SELECTION TIME You made a mistake. I Guess you're under 5. Here is a special program for children of your age. How many fingers do you have? Push A if you think you have 7; push B for 10; or C for 15, now. | SELECTION TIME Thank you. I now know you are under 5 years old. Here is a special program for children your age How many fingers do you have? Push A if you think you have 7; push B for 10; or C for 15, now. | SELECTION TIME THANK YOU. I'M PLEASED TO KNOW YOU'RE 5 OR OLDER. YOU MUST BE IN SCHOOL BY NOW! I HAVE A SPECIAL PROGRAM FOR YOU SCHOOL-AGE-CHILDREN, AND WE CAN BEGIN IT IF YOU PUSH THE QUESTION BUTTON, NOW. | SELECTION TIME I DIDN'T TELL YOU TO PUSH THIS BUTTON, SO I'LL ASSUME YOU MEANT TO TELL ME THAT YOU ARE 5 OR OLDER. I HAVE A SPECIAL PROGRAM FOR YOU SCHOOL-AGE CHILDREN, AND WE CAN BEGIN IT IF YOU PUSH THE QUESTION BUTTON, NOW. |
| SELECTION TIME OK. How many states are in the United States? Push A for 25; B for 46, or push C for 50, now! | SELECTION TIME Uh oh, only 7? I think you miscounted. The answer is 10. Please push the QUESTION button now! | SELECTION TIME That's right, 10 fingers! You found each and every one! Please push the QUESTION button now! | SELECTION TIME Uh oh, 15? You're wrong - the answer is 10. Let's continue. I want you to please push the QUESTION button, now |
| SELECTION TIME Here is your next question, and it's special because I know you're | SELECTION TIME OH NO. YOU THINK THERE ARE ONLY 25 STATES! ACTUALLY, THERE ARE | SELECTION TIME OH NO. YOU THINK THERE ARE ONLY 46 STATES? ACTUALLY, THERE ARE | SELECTION TIME TERRIFIC YOU KNOW THAT THERE ARE 50 STATES IN THE UNITED STATES! I'M |

EXAMPLE 2-continued

| CHANNEL 1 "QUESTION" | CHANNEL 2 "A" | CHANNEL 3 "B" | CHANNEL 4 "C" |
|---|---|---|---|
| 5 years old. Who is Mickey Mouse's girlfriend? Push A for Minnie, B for Lucy, or push C for Mabel, now! | 50. I THOUGHT YOU WOULD KNOW THAT, SINCE YOU ARE 5 YEARS OLD OR OLDER. LET'S CONTINUE. PLEASE PUSH THE QUESTION BUTTON, NOW. | 50. I THOUGHT YOU WOULD KNOW THAT, SINCE YOU ARE 5 YEARS OLD OR OLDER. LET'S CONTINUE. PLEASE PUSH THE QUESTION BUTTON, NOW. | SO GLAD FOR SURE YOU WOULD KNOW THAT, SINCE YOU ARE 5 YEARS OLD OR OLDER. GREAT JOB. LET'S CONTINUE. PLEASE PUSH THE QUESTION BUTTON, NOW. |
| SELECTION TIME I JUST LOVE ASKING YOU QUESTIONS! HERE'S ANOTHER: WHAT MAKES A RAINBOW? PUSH C IF YOU THE SKY AND THE MOON MAKE IT, OR PUSH D IF YOU THINK THE SUN AND RAIN MAKE RAINBOWS, NOW. | SELECTION TIME Minnie is absolutely right! Here's another question: Where does milk come from? Push the QUESTION button if you think it comes from a cow, or push A if it comes from a horse, now. | SELECTION TIME Lucy is wrong - it's Minnie! Here's another question: Where does milk come from? Push the QUESTION button if you think it comes from a cow, or push A if it comes from a horse, now. | SELECTION TIME Mabel is wrong - it's Minnie Here's another question: Where does milk come from? Push the QUESTION button if you think it comes from a cow, or push A if it comes from a horse, now. |
| SELECTION TIME Wow! You know that milk comes from cows. You are very smart for someone who is younger than 5 years old . . . | SELECTION TIME Hee hee. Milk comes from horses? No silly, the milk we drink comes from cows. I'll forgive you, since you are not even 5 yet . . . | SELECTION TIME NO, NOT THE SKY AND THE MOON. SINCE YOU'RE 5 OR OLDER, YOU SHOULD KNOW THAT RAINBOWS ARE MADE BY THE SUN AND RAIN . . . | SELECTION TIME I'M SO HAPPY YOU KNOW THAT THE SUN AND RAIN MAKE RAINBOWS - BUT SINCE YOU'RE 5 OR OLDER, IT WAS A VERY EASY QUESTION FOR YOU TO ANSWER . . . |

This is Made possible by properly timing and synchronizing the tracks of the tape. FIG. 3 shows a decision-tree corresponding with example 2. The program for each of the categories is alternated between the channels so that the program for children under 5, written in lower case, shares channel space with the program written for children 5 and over, written in upper case. Each program remains completely independent.

Since just one channel is necessary to maintain a memory of the child's age, the remaining channels may be used in different configurations. At level 2, the first channel, labeled "QUESTION" is reserved to recall the age of the children over 5 category, while the remaining channels are used to ask 3 response multiple choice questions. At level 4, two channels are reserved for each category, allowing simultaneous two answer questions to be given to children in each category. If desirable, 3 categories could be maintained on 4 channels, while still asking 2 answer multiple choice questions of the child.

Configured as in this example, the system exhibits a "vertical memory" throughout a program. At any time during the program, it is known if the child is under 5 years of age, or older than 5. By stating this fact at times throughout the program, the appearance is created that the toy exhibits memory. This method can be used to recall information on the child's sex, whether the child knows how to ride a bicycle, whether the child lives in the country, or any other information with 2 possible answers.

Figure 4:
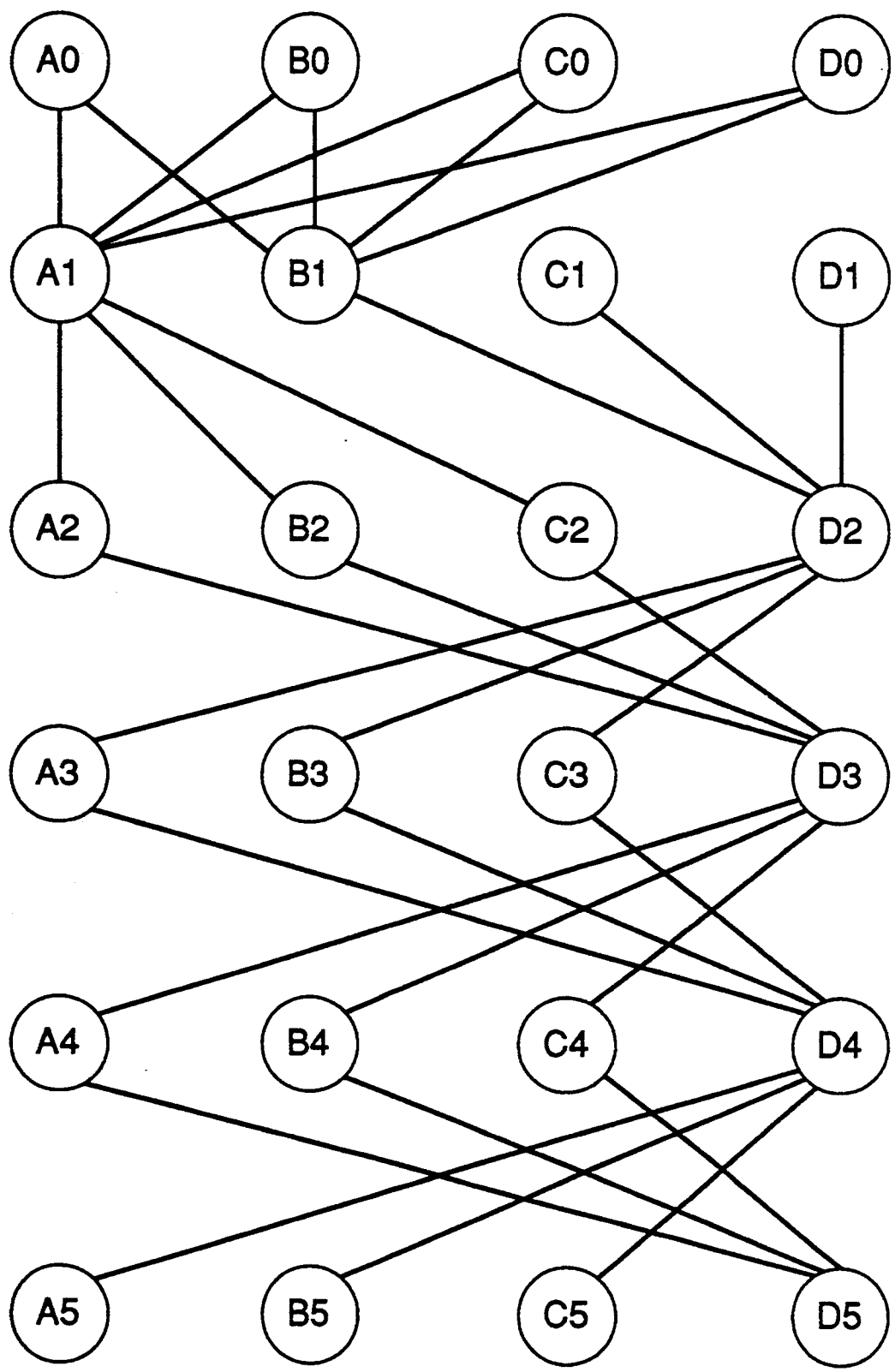
FIG. 4 is an illustration of the decision-tree corresponding with example 3.

As demonstrated in example 2, the questions can be tailored to the child's categorical information, or the same questions may be used when it is only desirable to create the impression of memory. If desired, at various times during the conversation, the content of the apparent memory may be changed. For example, the age memory used in example 2 may be changed to a gender memory (boy/girl) or any other such information, thereby simulating more complex conversation. Thus, the system may be used for profiling of children, wherein a conversation is created which contains a segment, segments or an entire program selectively geared to the specific information in the pseudomemory. Since the information in the memory is changeable, the system may substitute additional or new information given by the child into the stream of conversation. Example 3 demonstrates use of the system of the present invention to provide memory, cumulative memory, time-alternating, profiling and substitutability. FIG. 4 shows the decision-tree corresponding with example 3.

EXAMPLE 3

| CHANNEL 1 "A" | CHANNEL 2 "B" | CHANNEL 3 "C" | CHANNEL 4 "D" |
|---|---|---|---|
| If you are a girl press A, a boy press B. | Same as Channel 1 | Same as Channel 1 | Same as Channel 1 |
| SELECTION TIME I see you indicated you are a girl. If you live in the country press A, suburbs press B or city press C. Press now. | SELECTION TIME I see you indicated you are a boy. Ok, little boy. I now have a question for you, but first I need you to press button D for me now. | SELECTION TIME You are confused. I | SELECTION TIME Same as Channel 3 |
| SELECTION TIME Thank you. I now know you are a little girl who lives in the country (Specific information, | SELECTION TIME Thank you. I now know you are a little girl who lives in the suburbs. (Same as Channel 1 | SELECTION TIME Thank you. I now know you are a little girl who lives in a city. (Same as Channel 1 | SELECTION TIME Thanks little boy. Let,s sing a (Filler) |

EXAMPLE 3-continued

| CHANNEL 1 "A" | CHANNEL 2 "B" | CHANNEL 3 "C" | CHANNEL 4 "D" |
|---|---|---|---|
| songs, poems etc., for girl who lives in country) | but specific to girl who lives in suburbs) | but specific to girl who lives in city) | |
| OK little girl, that was fun. Please press a button for me. Press button D for me now | Same as Channel 1 | Same as Channel 1 | I now have a question for you. If you live in the country, Press A, Suburbs B, or City press C now. |
| SELECTION TIME | SELECTION TIME | SELECTION TIME | SELECTION TIME |
| I now know you are a boy who lives in the country. | I now know you are a boy who lives in the suburbs. | I now know you are a boy who lives in a city. | Thank you little girl. (Specific material for girls) |
| Specific material for boys who live in the country) | Specific material for boys who lives in suburbs) | (Specific material for boys who live in the city) | I would now like to know your age. If you are under 5 years old press A, between 5 and 10 press B, over 10 press C. Press now. |
| Thank you. That was fun - I hope you liked it. Press button D now. | Same as Channel 1 | Same A Channel 1 | |
| SELECTION TIME | SELECTION TIME | SELECTION TIME | SELECTION TIME |
| I now know you are a girl under 5 years old. | I now know you are a girl between 5 and 10 years old. | I now know you are a girl over 10 years old. | OK little boy. (Filler material for boys) I now have a question for you. I'd like to know your age. If you are under 5 years old Press A. Between 5 and 10 press B. Over 10 years old press C. |
| (Specific material for girl under 5 years old) | (Specific material for girl between 5 and 10 years old) | (Specific material for girl over 5 years old) | |
| I now need you to do something. Press button | Same as Channel 1 | Same as Channel 1 | |
| SELECTION TIME | SELECTION TIME | SECTION TIME | SELECTION TIME |
| I now know you are a boy who is under 5 years old. | I now know you are a boy between 5 and 10 years old. | I now know you are a boy over 10 years old. | Thanks, little girl. |
| (Specific material for boys under 5 years old) | (Specific material for boys between 5 and 10 years old) | (Specific material for boys over 10 years old) | (Specific material for girls) ... |
| ... | ... | ... | |

As shown in Example 4, the apparatus of the present invention may be used for a child to change the content of prerecorded music in response to multiple choice responses. The music for the song exists on all four channels, but each channel has a different content, i.e. different musical instruments, different singer(s). As the song progresses, the child can select different channels at any time, thus altering who sings the song, or which instruments are played. All types of combinations are possible, and the mix of characters and instruments can change during the song. This technique can also be used for music alone where each channel may represent a different musical instrument, tempo, or beat.

EXAMPLE 4

| CHANNEL 1 "GREEN" | CHANNEL 2 "YELLOW" | CHANNEL 3 "RED" | CHANNEL 4 "BLUE" |
|---|---|---|---|
| Here is a song you will like. If you press the YELLOW button, a piano also plays along. Press RED and a trombone joins in also. Press BLUE and Snoopy sings as well. (CONTINUOUS MUSIC PLAYS) | Same as Channel 1 (CONTINUOUS MUSIC WITH PIANO) | Same as Channel 1 (CONTINUOUS MUSIC WITH PIANO AND TROMBONE) | Same as Channel 1 (CONTINUOUS MUSIC WITH PIANO, TROMBONE, AND SNOOPY) |
| Let's change everything. Now, if you press GREEN, the music will go faster. Push YELLOW, and big drums come in . . . (etc.) | Same as Channel 1 | Same as Channel 1 | Same as Channel 1 |

In an alternative embodiment, the apparatus may provide separate musical instruments or voice accompaniment to a particular piece of music on the various tracks of the media. In this configuration, the system would allow more than one multiple choice response to be selected at a particular time, the various selected channels being mixed to provide variations on the same piece of music. For example, if the channels A, B, C, and D contained piano, guitar, trombone and flute versions of the same music, if buttons A and C were depressed simultaneously, the music would be heard with piano and trombone only. If at any time during the music button B were depressed, the guitar music would be added to the output heard by the child. If button A were released, only guitar and trombone would be heard. Many different variations of this embodiment are foreseen.

If desired, the interactive apparatus of the present invention may include a book with a content corresponding with the content of the stored conversations. The book might include pictures, for which questions will be asked, and the labels on the keys might be altered to correspond with the selections in the book. Additionally, if video output is to be used in an embodiment of the present invention, the video display might correspond with the questions asked in the course of the conversation. If it were desired to use a touch screen, the screen display might include labels for the multiple choice selections at the locations of the multiple choice selection switches on the screen.

By way of example, the interactive apparatus of the present invention, as previously mentioned, could keep track of correct responses for a complete interactive scenario, such as, for example, keeping track of 15 consecutive right answers (the entire tape), offering a choice of topics, and providing a reinforcement if all 15 questions are answered correctly. In this program, which is Example 5, the child must answer the first twelve questions all correctly in order to accompany the toy on its trip to the center of the Earth. Using methods outlined previously, the users are separated into two categories: all correct, and everything else. As shown below, Channel 4 is for children who answered all twelve correctly, and therefore can go on the trip. (Channels 1, 2, and 3 were not all correct, and are told to rewind the tape and to try again to answer all 12 questions correctly. Children would be told to rewind the tape and are reprimanded two separate times if they don't.) On Channel 4, the apparatus then embarks on its journey to the center of the Earth.

After the trip, the apparatus has three final questions for the child. Since it is known that everyone who went on the trip had to have answered the first twelve correctly, it now looks for three-in-a-row correct in order to have all 15 questions in a row correct. In order to do this, the apparatus then asks Question 13, with answer choices for all channels being 1 (Ch 1), 2 (Ch 2), 3 (Ch 3), and 4 (Ch 4). After answering, we know:

| Ch 1: | Q13 wrong |
| Ch 2: | Q13 wrong |
| Ch 3: | Q13 right |
| Ch 4: | Q13 wrong |

For Question 14, answer choices offered on Channels 1, 2, and 4 (got Q 13 wrong) are A (Ch 2), B (Ch 3), and C (Ch 4); on Channel 3 (got Q13 right), answer choices offered are 1 (Ch 1), 2 (Ch 2), and 3 (Ch 3). After answering Question 14, we are concerned mainly with Channel 1 (got both Q13 and Q14 correct). Channels 2, 3, and 4 contain mixtures of right/wrong answers. For Question 15, on Channel 1 (got both right so far) answer choices offered are A (Ch 2), B (Ch 3), and C (Ch 4); on Channels 2, 3, and 4, answer choices offered are 1 (Ch 1), 2 (Ch 2), and 3 (Ch 3).

After answering Question 15, we know that on Channel 3, the child came close to getting all 15 correct in that they missed Q15 after getting Q13 and Q14 both correct. On Channel 4 we know that they got the last 3 questions all correct. And on Channels 1 and 2 we only refer to how the child did on Question 15, as their performance on Q13 and Q14 were any combination other than both right.

The apparatus could then offer everyone a choice of a joke topic. On Channels 2, 3, and 4 (did not get all 15 questions correct), topic choices offered are A (Ch 2), B (Ch 3), and C (Ch 4). On Channel 1 (did get all 15 questions right), topic choices offered are 1 (Ch 1), 2 (Ch 2), and 3 (Ch 3). The apparatus then tells the joke selected, and then goes on to wrap up the program. On Channel 1, however, he is able to congratulate the child on answering all 15 questions correctly. This is because only those children who answered the final three questions in a row correctly had the option to select Channel 1 (for a joke topic). Channel 1 does not, however, contain all of the children who had perfect performance, since they also had options of choosing Channels 2 and 3 for other joke topics.

By doing the above, the "memory power" on the interactive toy can extend to an entire tape.

EXAMPLE 5

| QUESTION | A | B | C |
| YES | NO | TRUE | FALSE |
| 1 | 2 | 3 | 4 |
| --- | --- | --- | --- |
| Let me review. Question number 1 (beep), question number 2 (beep), question number 3 (beep), question number 4 (beep), question number 5 (beep), question number 6 (beep), question number 7 (beep), question number 8 (beep), question number 9 (beep), question number 10 (beep), question number 11 (beep), question number 12 (beep). | Same as Ch 1 | My memory bank are informing me that you get question 1 (beep) right, question 2 (beep), right, question 3 (beep) right, question 4 (beep) right, question 5 (beep) right, question 6 (beep) right, question 7 (beep) right, question 8 (beep) right, question 9 (beep) right, question 10 (beep) right, question 11 (beep) right, question 12 (beep) wrong! Oh, no! You missed question 12, after getting question 1 through 11 correct. I am sorry, that's too bad, but next time I'm sure you'll remember the answer and get this question right also. I am sorry You have to rewind this tape to the beginning. That's right, we have to start over. You have to remember everything you can about these questions so eventually you can get them all | Same as Ch 3 |
| Okay my memory banks are now informing me that you have not gotten the answers to all of my questions correct. And therefore, you cannot go on this trip to the center of the earth. Let me tell you what you have to do. You have to rewind this tape to the beginning. That's right, we have to start over. You have to remember everything you can about these questions so eventually you can get them all correct and go with me to the center of the earth to see Mother Nature. What a great trip. Okay, so push the stop button, then push the rewind button all the way until the beginning of this cassette. See you later. | Same as Ch 1 | | 12 (beep) right. Holy mackeral! Your have gotten all of my questions right. Congratulations to you. And you have now earned this very exciting trip with me in a special craft to the center of the earth. I don't mind telling you that this trip is very dangerous. I guess I'll go and you can stay here and help me by pressing my buttons. Or, then again, maybe I could send you and I could stay here where it's safe. Uh, I guess that won't work. In any case, I'll go the |

EXAMPLE 5-continued

| QUESTION<br>YES<br>1 | A<br>NO<br>2 | B<br>TRUE<br>3 | C<br>FALSE<br>4 |
|---|---|---|---|
| Bye. Rewind NOW. | | correct and go with me to the center of the earth to see Mother Nature. It's a great trip. Okay, so push the stop button, then push the rewind button all the way until the beginning of this cassette. Okay, see you later. Bye. Rewind NOW. | reason the trip is very dangerous is to go to the center of the earth first we have to go through about 14 miles of the earth's crust which is rock and dirt. Then we're going to enter the mantle of the Earth, and this is about 3,000 |
| Question number 13. What does "recycle" mean? Mother Nature told us to recycle, but what does this word really mean? 1) to ride a bicycle again, 2) to save energy, 3) to use something again, or 4) to eat cheese and lettuce. Please answer 1, 2, 3, or 4 NOW. | Same as Ch 1 | Same as Ch 1 | Same as Ch 1 |
| FX Computer Sounds<br><br>This is a very creative answer. Recycle - to ride a bike again. It sort of makes sense but it is wrong. Recycle means to use something again and again. | FX Computer Sounds<br><br>To save energy is a very good guess, but not the right one. To recycle means to use again and again. I am sorry. | FX Computer Sounds<br><br>You are very smart. That's probably why I got to the center of the earth, and you sat comfortably in front of me. Recycle does mean to use again. Good work | FX Computer Sounds<br><br>You must be a comedian or something because you can't possibly think that recycle means to eat cheese and lettuce. I am sorry. Recycle means to use again and again. |
| Question number 14. Who are the best people to run our country? Here are three choices: A) people who do not care about the earth, B) people who have an IQ of less than 80, C) people who will pass laws to help protect the earth. Please press A, B, or C NOW. | Same as Ch 1 | Same as Ch 1<br><br>1) people who pass laws to help protect the earth, 2) people who do not care about the earth, or 3) people who have an IQ of less than 80. Please press 1, 2, or 3 NOW. | Same as Ch 1 |
| FX Computer Sounds<br>Good answer. You are right. People should run our country that care about the earth and help pass laws to protect it. Good answer. | FX Computer Sounds<br>You are wrong, of course. We should elect people to help run our country who will help the earth and pass laws to protect it. | FX Computer Sounds<br>Of the three choices I gave you, this answer is the funniest, but wrong, we would elect people who help pass laws to protect the earth. | FX Computer Sounds<br>Same as Ch 1 |
| Question number 15. If you were riding in a car and you were chewing gum, what should you do with the gum? A) open the window and throw it out as far as you can, B) stick it to the back of the driver's head, or C) put it away and throw it away in a garbage can later. Please press A, B, or C NOW. | Question number 15. You are ridng in a car, and you have finished drinking a drink or are finished chewing gum, what should you do with it? Here are only two choices: 1) put it away and throw it out later in a garbage can, or 2) open the window and throw it out as far as you can. Press 1 or 2 NOW. | Same as Ch 2 | Same as Ch 2 |
| FX Computer Sounds<br>A very nice answer. This was the correct and very serious answer to this question. You are right. When you have garbage in a car or on a train, or even on a bus, you should put the garbage in your pocket and throw it out later when you come to a garbage can. This is the right and proper environmentally sound thing to do. Your answer is right. | FX Computer Sounds<br>I can only hope that you are not telling the truth and are having fun with me. I cannot believe that you really think that you should open the widow and throw out garbage. That's ridiculous. You should save it and put it in a garbage can later. I'm sure you know this. I hope you do and I can only hope that you were kidding and fooling around with me, 2-XL. | FX Computer Sounds<br>Before I tell you if you are right or wrong, I'd like to check a memory bank (Fx-Memory tones). Ah, just as I suspected, you got question 13 right, question 14 right, but missed question number 15. But t his was a very funny answer. You believe you should put the gum on the back of the driver's head. Now that's funny. That's a funny answer. It's wrong, but funny | FX Computer Sounds<br>Let me check my memory banks for a moment (Fx-memory tones). Ah, just as I suspected. You knew that recycling meant, you knew who the best person to run the country was (beep), and you know what to do with garbage in a car. Good work you have gotten these last three questions correct. That's very, very good I am very proud of you and so would Mother Nature be. Good work. |
| Well, it is time for me to go, but before I do, I would like to give you one last joke and let you choose the topic. After all, I let Mother Nature choose a topic, so I might as well let you chosse a topic also. Here are three topics to pick from: if | Same as Ch 1 | Same as Ch 1 | Same as Ch 1<br><br>Here are three choices |

EXAMPLE 5-continued

| QUESTION | A | B | C |
|---|---|---|---|
| YES | NO | TRUE | FALSE |
| 1 | 2 | 3 | 4 |
| you would like this joke to be about tonsils, press A), a pencil, press B) or a shower, press C), Please pick up your finger and press, A, B, or C NOW. | | | of jokes that I will tell you. If you want a joke about the shower, press 1, tonsils, press 2, or a pencil, press 3. Press 1, 2, or 3 NOW. |
| FX Computer Sounds You know what's interesting? Many children who get my last three questions right like you have picked a shower joke. I do not know why. In any case, here is your joke. What kind of man does not get his hair wet in the shower? Easy, a bald man. (robot laughs) | FX Computer Sounds Now what type of person would pick a tonsil joke? Come on, now, be serious. A tonsil joke? Well, here's your joke. What did one tonsil say to the other tonsil? Get dressed, honey, the doctor is taking us out tonight. (robot laughs) | FX Computer Sounds Now, let's see here. You do not want a shower joke, you do not want a tonsil joke, oh yes, you choose a pencil joke. Well I have some bad news, I cannot tell you a pencil joke because in many cases they do not have a point! (robot laughs) | FX Computer Sounds Perhaps you misunderstood me. This is a shower joke. Not many people pick a shower joke once they know it's a shower joke. In any case, here's the joke. What type of man does not get his hair wet in the shower? Easy, a bald man. (robot laughs) |
| Holy mackeral! I just noticed something. My long-term memory banks (Fx- Memory tones) are telling me that, assuming you have followed all of my instructions properly, you have answered all of the 15 questions in this program correctly. That's incredible, wonderful, great and a spectacular performance. Very impressive work. I am proud to be your partner. Well, it's time for me to go. I hope you enjoyed this program on Planet Earth, and remember, if all the children of the world work very hard to help save the earth, you will save the earth. Everything I said in this program was 100 percent true, accurate, correct, and right, except I must admit, I made up one little tiny itsy bitsy part. What part of this program do you think I | Well its almost time for me to go. I hope you enjoyed this program on Planet Earth, and remember, if all the children of the world work very hard to help save the earth, it will then be a cleaner, nicer, and better place for you to grow up. Well, its still almost time for me to go, not quite but almost. But before I go there is one last thing I'd like to ask you.

Same as Ch 1 | Same as Ch 2

Same as Ch 1 | Same as Ch 2

Same as Ch 1 |

As previously mentioned, another aspect of the interactive toy of the present invention is the ability to keep information about the child over a long-term period by using a "code word." This feature is illustrated below in Example 6. The first question in the program of Example 6 asks whether the child playing is a girl (A - Ch 2) or a boy (B - Ch 3). After answering, the categories are as follows:

| Ch 1: | error - assumes girl |
| Ch 2: | girl |
| Ch 3: | boy |
| Ch 4: | error - assumes boy |

Boys and girls are kept separate for Question 1, with the same breakdown as above. At this point, 2-XL tells the girls (Ch 1 & 2) to remember the code word "bananas"; and tells the boys (Ch 3 & 4) to remember the code word "apples." The two sexes are then mixed back together in Question 2, as the program continues.

Later, the child's sex is incorporated into the last question of the program. The apparatus asks the child to recall the code word given: 1 - bananas (Ch 1) or 2 - apples (Ch 2). (Channels and 4 are not offered as choices, and if the child selects either by mistake, the child is reprimanded. The apparatus selects "bananas" as the choice.)

Assuming that the girls remembered their code word "bananas" and are now on Channel 1, while the boys remembered "apples" and are now on Channel 2, we proceed with the final question. Girls (Ch 1, 3 & 4) are offered topic choices of 1 - bicycles (Ch 1) and 2 - pets (CH 2). Boys are offered 3 - bicycles (ch 3) and 4 - pets (Ch 4).

After selecting, we now know:

| Ch 1: | girls & bicycle question |
| Ch 2: | girls & pet question |
| Ch 3: | boys & bicycle question |
| Ch 4: | boys & pet question |

Regardless of the topic chosen, the girls (CH 1 & 2) are then offered answer choices of True (Ch 3) and False (CH 4). Boys (CH 3 & 4) are offered 1 (CH 1) and 2 (CH 2).

After answering, we know:

| Ch 1: | boys & wrong (don't know topic) |
| Ch 2: | boys & right (don't know topic) |
| Ch 3: | girls & right (don't know topic) |
| Ch 4: | girls & wrong (don't know topic) |

The toy can then sign off of this program knowing the child's sex, which makes for a more personal, powerful conclusion (i.e, "Goodbye, little boy.")

EXAMPLE 6

| QUESTION<br>YES<br>1 | A<br>NO<br>2 | B<br>TRUE<br>3 | C<br>FALSE<br>4 |
|---|---|---|---|
| Thank you very much for turning me on. I am your toy robot 2-XL, and this program is called Fun and Games. It will be my job to provide questions and games. It will be your job to have fun. As usual, please follow my instructions carefully. Only press the buttons I tell you to press and only after I say the word NOW. Before we begin I would like to know if you are a girl or a boy. If you are a girl, press A. If you are a boy, press B. Please press A or B NOW. | Same as Ch 1 | Same as Ch 1 | Same as Ch 1 |
| FX Computer Sounds<br>You have made an error. It is important that you follow my instructions. I will have to assume you are a girl since this button is closest to the girl button. | FX Computer Sounds<br>Thank you for answering my question. I now know you are a little girl. Well, it is nice to meet you. I am 2-XL, your robot, but I guess you already knew that. | FX Computer Sounds<br>Thank for answering my question. I now know you are a little boy. Well, it's nice to meet you. I am 2-XL, your toy robot, but I guess you already knew that. | FX Computer Sounds<br>You have made an error. Please follow my. instructions carefully I will have to assume you are a boy since you pushed a button closest to the boy button. |
| For questions 1, 2, 3, 4 and 5, I would like to play a little game with you called "Name this Sound." In this game, I will play sounds for you and it will be your job to tell me where the sounds come from. As a special treat, if you get all five of these questions correct, I will give you two extra jokes, plus a secret as a reward. Let's begin - question number 1. What is this the sound of? (FX-galloping horse) Pretty easy if you ask me. Here are only two choices: Was that the sound of 1) a drum, or 2) a horse running. Please press 1 or 2 NOW. | Same as Ch 1<br><br><br><br><br><br><br><br><br><br>Same as Ch 1 | Same as Ch 1<br><br><br><br><br><br><br><br><br><br>Pretty easy if you ask me. Okay, I'll make this a true or false question. True or false, that was the sound of a drum. Press True or False NOW. | Same as Ch 1<br><br><br><br><br><br><br><br><br><br>Same as Ch 3 |
| FX Computer Sounds<br>I guess this was not as easy as I thought. I am sorry to report you are wrong. That was the sound of a horse running. I now need you to do something very important. Remember the code word bananas. Yes, your special code word to remember is bananas. | FX Computer Sounds<br>I guess I was right about this being an easy question. You are right. That was the sound of a horse running.<br>Same as Ch 1 | FX Computer Sounds<br>I guess I was wrong about this being an easy question for you. You are wrong. That was the sound of a horse running. I now have something very important for you to do. I need you to remember the code word apples. Yes, remember the code word apples. | FX Computer Sounds<br>I guess I was right about this being an easy question. False is correct. That was the sound of a horse running.<br>Same as Ch 3 |
| You have made an error, so I will pick kangaroos, jumping, and you. | You have chosen kangaroos, jumping, and you. | You have chosen bears, cubs and the zoo. | You have chose birds, trees, and nests. |
| This poem is about a kangaroo. Everything I say happens to be true, A kangaroo can jump real high, He can even jump over you. A kangaroo needs open space, to keep a smile on his face.<br><br>He hops around from place to place, And never needs to tie a lace. He's happy when he's free. At least, that's what he tells me. Australia is a kangaroo's home. I hope you like your little poem. | Same as Ch 1 | There are bears in the forest and bears in the zoo, Most bears are much bigger than me and you. Panda bears are black and white, Grizzly bears are dark as night. Polar bears live in snow and ice. But Koala bears think Australia's nice. Bears like to fish - like people do! some like to hunt and go swimming to. "Cub" is what we call a baby bear, Cubs are cute and have fuzzy hair. I hope you liked this little rhyme. You can pick another, if you like, next time. | I love to watch birds in the sky, because they're so pretty when they fly. In tall trees birds build their nest Because that's where they like to rest. Birds come in all shapes and sizes too -- and all different colors from red to blue. Birds, like the flamingo, are very tall, And birds, like the sparrow, are quite small. Some birds like to live on land, Some birds think that the sea is grand. I hope that you liked these words, because this poem was all |

EXAMPLE 6-continued

| QUESTION YES 1 | A NO 2 | B TRUE 3 | C FALSE 4 |
|---|---|---|---|
| You see, your robot is a little poet - and didn't even know it! (robot laughs) | Same as Ch 1 | Same as Ch 1 | about birds. Same as Ch 1 |
| Let's get back to business here. I want to know if you can remember the special code word I gave you at the beginning of this program. If your special code word was bananas, press 1). If your special code word was apples, press 2). Please press 1 or 2 NOW. | Same as Ch 1 | Same as Ch 1 | Same as Ch 1 |
| FX Computer Sounds Thank you for your cooperation. I am getting a little tired now, so this will be you last question. | FX Computer Sounds Same as Ch 1 | FX Computer Sounds You have made an error. And if you make errors, it makes me make errors. Please follow instructions. | FX Computer Sounds Same as Ch 3 |
| For this question, I will give you a choice of topics. If you would like this question to be about bicycles, press 1). Pets, press 2). Please press 1 or 1 NOW. | Same as Ch 1 bicycles, press 3), or pets, press 4). Press 3 or 4 NOW. | Same as Ch 1 | Same as Ch 1 |
| FX Computer Sounds This will be a true or false question on the topic that you selected, so please use my True or False buttons. True or false, a bicycle with three wheels is called a tricycle. Please pick up your pointer finger and press True or False NOW. | FX Computer Sounds This will be a true or false question on the topic that you selected, so please use my True or False buttons. True or false, every hour in America, over 10,000 brand new, new-born puppies are born. Answer True or False NOW. | FX Computer Sounds Here is your bicycle question as you requested. If you have a bicycle with three wheels, what is it called? here are two choices: 1) a scooter, or 2) a tricycle. Please pick up your pointer finger and press 1 or 2 NOW. | FX Computer Sounds Here is your question on the topic that you selected. In America each hour, how many baby puppies are born? Here are two choices: 1) 100 puppies, or 2) 10,000 puppies. Please answer 1 or 2 NOW. |
| FX Computer Sounds You may want to trade in your brain for a hand-held calculator. You are wrong, I am sorry to report. Too bad | FX Computer Sounds Put me in front of the entire family - plus the postman, so I can tell them how smart you are. Good work | FX Computer Sounds Same as Ch 2 | FX Computer Sounds Same as Ch 1 |
| Well, it is time for me to go. I just wanted to mention three things: 1) the next time you play this program, push different buttons, and you will get different answers. 2) I hope you did your job and had fun. And 3) thank you very much for working with me, little boy. | Same as Ch 1 Same as Ch 1 | Same as Ch 1 And 3), thank you very much, little girl, for working with me. | Same as Ch 1 Same as Ch 3 |
| Goodbye and please push my stop button and then my rewind button NOW. (FX-computer noises) | Same as Ch 1 | Same as Ch 1 | Same as Ch 1 |
| I am still on. Please turn me off NOW. (FX-computer noises) | Same as Ch 1 | Same as Ch 1 | Same as Ch 1 |
| Uh, oh. I am still on. Please turn me off NOW. (computer noises) | Same as Ch 1 | Same as Ch 1 | Same as Ch 1 |
| ALARM END | ALARM END | ALARM END | ALARM END |

Another example of the tremendous power and flexibility of the interactive conversational apparatus of the present invention over my prior patented apparatus, such as disclosed in U.S. Pat. No. 4,078,316 is the ability to provide a number of choices to the child which is greater than the number of available channels. Although such an objective has been achieved by me in connection with my patented interactive television systems discussed previously herein, such systems all required a microprocessor. With the system of the present invention, no microprocessor is employed. For example, as shown below in Example 7, a child may be given six choices to pick from at one time while using only four channels and four answer buttons. In the following example, the toy offers the child a choice of six jokes. They are offered in two groups of threes, with answer choices as follows: 1 - Joke #1 (Ch 1); 2 - Joke #2 (Ch 2); 3-Joke #3 (Ch 3); or 4 - wait to hear other joke topics (Ch 4).

After choosing, Channels 1, 2 and 3 deliver their jokes, as promised. Meanwhile, on Channel 4 the next 3 topics are offered, as follows: A - Joke #4 (Ch 2); B - Joke #5 (Ch 3); and C - Joke #6 (Ch 4). At the moment of choices, note that Channels 2 and 3 (used to hear Jokes 2 and 3) are asked to push the Question button (Ch 1), while Channel 1 (Joke 1) is told to wait. This combines all of the jokes told so far (Jokes 1, 2, and 3) onto Channel 1 and frees up Channels 2 and 3 for use by Jokes 4 and 5.

After answering, the breakdown is as follows:

|       |                         |
| ----- | ----------------------- |
| Ch 1: | filler for Jokes 1, 2, and 3 |
| Ch 2: | Joke 4                  |
| Ch 3: | Joke 5                  |
| Ch 4: | Joke 6                  |

The program then continues as usual. This process, of course, can be used to provide six answer choices for a question, select from six different songs, and can easily be extended (using the same principals described above) to nine answer choices. (Using the principals described above, any number of answer choices can be provided. Each additional group of three requires a concomitant delay time but this process has no theoretical limitation.)

tions in a row correctly, as well as a "consolation" prize for answering the same three questions all incorrectly. In addition, the child is given two chances to answer the first two questions correctly.

This example has the added objective of "rewarding" children who miss all three questions, as well as those who get all three correct. So, we will be working with three categories:

| Category 1: | all three correct |
| Category 2: | all three incorrect |
| Category 3: | any mixture of correct/incorrect. |

Question 20 (the first of the three questions) is the same on all four channels. The correct answer is choice 2, which sends the child to Channel 2. The other three channels are incorrect answers.

For the second question (Question 21), two different questions are asked, based on how the child did on

EXAMPLE 7

| QUESTION<br>YES<br>1 | A<br>NO<br>2 | B<br>TRUE<br>3 | C<br>FALSE<br>4 |
| --- | --- | --- | --- |
| Thank you, the smart and nice, 2-XL and partners at home. And thanks for letting me slip in my banana joke.<br>No problemo, I'm glad you got to slip in your joke. Please hold on to me, we are about to travel back to the present.<br>(FX-Time machine sounds)<br>We are back. Let's take a little joke break. I will give you a choice of six jokes and you pick the topic of the joke you want me to tell you. Here are the first three choices: if you want this joke to be about the invisible man, press 1), about Daniel Boone, press 2), a teacher, press 3). Or if you want to wait for three other topics, press 4). Press my buttons NOW. | Same as Ch 1<br><br><br><br><br><br><br><br>(FX-Time machine sounds)<br>Same as Ch 1 | Hold on to me please. We are about to travel back to the present.<br><br><br><br><br><br>(FX-Time machine sounds)<br>Same as Ch 1 | Same as Ch 3<br><br><br><br><br><br><br><br>(FX-Time machine sounds)<br>Same as Ch 1 |
| FX Computer Sounds<br>What does the invisible man drink at snack time? Easy, evaporated milk. (robot laughs)<br><br>I now need you to do something very simple - wait, do absolutely nothing | FX Computer Sounds<br>How does Daniel Boone spell Indian tent with two letters? Easy, T-P. (teepee - robot laughs)<br>I now need a favor. Please press the Question button NOW. | FX Computer Sounds<br>What does and eye doctor and a teacher have in common? They both test pupils (robot laugh).<br><br>Same as Ch 2 | FX Computer Sounds<br>Here are three more choices for your. If you want this joke to be about a car radio, press A), a knock-knock joke, press B), or a joke about an astronaut, press C). Please pick up your pointer finger and press A, B, or C NOW. |
| FX Computer Sounds<br>I hope you enjoyed your joke. Remember, the next time you play this program, you can pick from three other jokes that I will give you. | FX Computer Sounds<br>What tune does a car radio play? that's easy, a car-turn (cartoon). (robot laughs) | FX Computer Sounds<br>Knock, knock. Who's there? Boo. Boo who? Oh, don't cry. (robot laughs) | FX Computer Sounds<br>What is an astronaut sandwich made from? Launch meat. (robot laughs) |
| Let's get back to business here. If you would like us to talk to George Washington, press A). Or if you would prefer Orville Wright, press B). Please press A or B NOW. | Same as Ch 1 | Same as Ch 1 | Same as Ch 1 |
| FX Computer Sounds<br>You have made an error, so I will surprise you when we get there. Hold on.<br>(FX-Time machine sounds) | FX Computer Sounds<br>Let's now go back almost 200 years to talk with George Washington.<br>(FX-Time machine sounds) | FX Computer Sounds<br>Let's now go back almost 100 years to talk with Orville Wright.<br>(FX-Time machine sounds) | FX Computer Sounds<br>Same as Ch 1<br><br><br>(FX-Time machine sounds) |

Still another example is illustrated below in Example 8 in which the system can keep track of both right and wrong answer streaks simultaneously. In the below example a reward is offered for answering three questions Question 20. On Channel 2 (got Question 20 right), answer choices for Question 21 are 1 (Ch 1) and 2 (Ch 2). On Channels 1, 3, and 4 (missed Question 20), answer choices are True (Ch 30 and False (Ch 4). After answering Question 21, we know:

| | |
|---|---|
| Ch 1: | got Q20 right/got Q21 wrong (Category 3) |
| Ch 2: | got Q20 right/got Q21 right (Category 1) |
| Ch 3: | got Q20 wrong/got Q21 wrong (Category 2) |
| Ch 4: | got Q20 wrong/got Q21 right (Category 3) |

For question 22, on Channels 1 and 4 (not eligible for reward or consolation), answer choices offered are A (Ch 2) and B (Ch 3). On Channel 2 (both right), answer choices are 1 (Ch 1), 2 (Ch 2), and 3 (Ch 3). And on Channel 3 (both wrong), answer choices are True (Ch 3) and False (Ch 4). After answering Question 22, we know:

| | |
|---|---|
| Ch 1: | got all 3 right - gets reward |
| Ch 2: | Category 3 (mixed) no reward or consolation |
| Ch 3: | Category 3 (mixed) no reward or consolation |
| Ch 4: | got all 3 wrong - gets consolation |

Please note that because Channels 2 and 3 contain such a mixture of variables, 2-XL does not even acknowledge whether they got Question 22 right or wrong, and just gives them 2 answer points regardless (this is not part of the reward or consolation).

EAMPLE 8

| QUESTION<br>YES<br>1 | A<br>NO<br>2 | B<br>TRUE<br>3 | C<br>FALSE<br>4 |
|---|---|---|---|
| For questions 20, 21, and 22, I'd like to do something a little different, if you get all three right, I will give you 4 extra points as a bonus, plus 2 jokes. If you get all three wrong, I will give you 2 extra points as a boo-boo prize, plus 1 joke to make you feel better. For questions 20 and 21 only, I will give you two chances at the answer to make it even easier. Okay, here we go. Question 20. In football, what is the most important piece of equipment that a player wears? 1) ankle pads, 2) helmet, 3) spinal brace, or 4) knee pads. Press 1, 2, 3, or 4 NOW. | Same as Ch 1 | Same as Ch 1 | Same as Ch 1 |
| | Same as Ch 1 | Same as Ch 1 | Same as Ch 1 |
| FX Computer Sounds<br>Come here, you are wrong. Choose a different answer NOW. | FX Computer Sounds<br>A slight power failure, don't worry, I'll fix it. Do nothing. | FX Computer Sounds<br>Pssssst. You are wrong. Choose a different answer NOW. | FX Computer Sounds<br>Same as Ch 1 |
| FX Computer Sounds<br>I have given you two chances, and you are still wrong. The helmet is the most important piece of equipment for a football player. Take zero points. Question 21. Is this story True or False? In 1945, because of the war, a Canadian professional hockey team used a woman goalie instead of a man. If you thing this story is true, press True. If it's not true, press False. Please press true or false NOW. | FX Computer Sounds<br>Your brain is operating properly, you have answered helmet and you are right. This is the most important piece of equipment for a football player. Take two points. Question number 21. The worst sport disaster in history happened in 1982, where 340 people died leaving a soccer game. In what country did this occur? 1) Germany, or 2) Russia. Press 1 or 2 NOW. | FX Computer Sounds<br>Same as Ch 1 | FX Computer Sounds<br>Same as Ch 1 |
| FX Computer Sounds<br>You are going to love this. You are wrong, but you may pick another answer so choose 1 or 2 NOW. | FX Computer Sounds<br>A little power failure folks, don't worry, do not panic. Please stand by. Do nothing. | FX Computer Sounds<br>You are going to love this. You have pressed true but this is wrong. Go ahead an press true or false again NOW. | FX Computer Sounds<br>Same as Ch 2 |
| FX Computer Sounds<br>This is pretty darn amazing if you ask me. I have given you two tries, and yet there were only two choices, and you still are wrong! This is incredible. You deserve pints just for doing this. So take one point for being wrong on a question where there were only two choices and I gave you two tries. Congratulations on this. Hold on for a moment while I check my memory banks. Do nothing. | FX Computer Sounds<br>Sorry, for the slight delay, but sometimes power failures do happen to robots. In any case I am happy to report you are right. This sports disaster happened in Moscow, Russia in Lenin Stadium in the year 1982, after a soccer game. Good work. You may take 3 points.<br>Same as Ch 1 | FX Computer Sounds<br>Same as Ch 1<br><br><br><br><br><br><br><br><br>Same as Ch 1 | FX Computer Sounds<br>I am a little disappointed in me, because I could not fool you. I made up this entire story about a woman goalie in a hockey game. I should be ashamed but I could not fool you. Good work, and for this good work, you may take 3 points. Write down 3 point.<br>Same as Ch 1 |
| (FX-Memory Tones)<br>My memory banks are informing me that you got the answer to question 20 right, but 21 | (FX-Memory Tones)<br>My memory banks are informing me that you got the answers to questions 20 and 21 both | (FX-Memory Tones)<br>My memory banks are informing me that you got the answers to questions 20 and 21 both wrong, | (FX-Memory Tones)<br>My memory banks are informing me that you got the answer to question 20 wrong. But you |

EAMPLE 8-continued

| QUESTION YES 1 | A NO 2 | B TRUE 3 | C FALSE 4 |
|---|---|---|---|
| wrong. And therefore, you cannot earn either the bonus for getting all three right, or all three wrong. So all you can do at this point is to try hard. Get this answer right and get those points. | right. So that means one more answer right, and you will have earned those 4 points and two jokes as a bonus. Good luck on question number 22. | which is sort of amazing considering everything I have given you. And that means if you get one more wrong, you will have earned those two points, and one joke as a booby prize. So bad luck on question 22. | have improved and got the answer to question 21 right. You cannot earn bonus points for either getting all three questions right, or all three questions wrong. So good luck on Question 22. |
| You may be interested to know that I am in a pretty good mood, so I will only give you two changes, and I'll even give you __points whether you get this one right or wrong. Here comes my easy question The super Bowl in football is played on what day of the week? A) Wednesday or B) Sunday. Please answer A or B NOW. | As you know, sit-ups are a good form of exercise. Well, Marine Captain Wayne Rollings began doing sit-ups and did not stop until he broke the world's record. What do you think the world's record is. Here are three choices 1) 17,000 sit-ups, 2) 25,000 or 3) 31,000 sit-ups. Answer 1, 2, or 3 NOW. | True or false, a man named Robert Foster broke the world's record for holding his breath under water for staying under water for over 13 and three-quarter minutes by the way don't you ever try this, because it could be very, very dangerous. In any case, was that story true or false. Pick up your finger and answer true or false NOW. | Same as Ch 1 |
| FX Computer Sounds I have some good news and some better news. The good news is you are right. 17,000 push-ups is the right answer. Take 3 points. The better news is my memory banks have informed me that you have answered question 20, 21, and 22 all correct. And therefore, you also earn 4 extras points as a bonus, plus two jokes. Congratulations, you are a genius. What has 18 legs and catches flies? A baseball team! (robot laughs) When is a cook mean? when he whips the butter and beats the eggs! (robot laughs) | FX Computer Sounds Instead of telling you if you are right or wrong. I have decided to you give two points no matter what, and give you this next question. Question 22 and a half. In a golf game, who is the winner, A) the person with the highest score or B) the person with the lowest score. Answer A or B NOW. FX Computer Sounds Perhaps your brain is taking a quick catnap. I am sorry to report you are wrong. In golf the person with the lowest score wins. I am sorry. Please take zero points. And better luck on this next question. | FX Computer Sounds Same as Ch 2

Same as Ch 2

FX Computer Sounds

Robots are very rarely impressed with people, but this is the right answer. Very good work. The winner in a golf game is the person with the lowerst score. You are right, and for being right, you can take two points. That's right, two points. | FX Computer Sounds I have some bad news which may really be good news. the bad news is the answer to this question was true. You have answered false so you are wrong and can take zero points. But my memory banks have informed me that you have answered question 20, 21, and 22 all wrong, and therefore, congratulations, because you get the booby extra points - put them down, prize of two plus one joke. Here's your joke. Did you know americans are getting stronger? 20 years ago, it took two people to carry ten dollars worth of groceries, today a five year old can do it. (robot laughs) |
| Question 23. In professional basketball how many personal fouls is a player allowed before he is thrown out of the game? A) 4 fouls, B) 6 fouls, or C) 8 fouls. Answer A, B, or C NOW. | Same as Ch 1 | Same as Ch 1 | Same as Ch 1 |
| FX Computer Sounds Your brain must be falling apart at the seams, 6 fouls is the right answer. Please write down zero points. | FX Computer Sounds Your brain nust be falling apart at the seams. You are wrong, 6 fouls is the right answer. Please write down zero points. | FX Computer Sounds Kareem Abduhl Jabar would be proud of you. 6 fouls is correct. Good answer. You may take three points. | FX Computer Sounds Same as Ch 2 |
| Question number 24. Since keeping score is a very important part of sports, I would like to see if you know which question I skipped in this program so far. If you do know what question I skipped press YES. If you do not know, press NO. Press YES or NO NOW. | Same as Ch 1 | Same as Ch 1 | Same as Ch 1 |
| FX Computer Sounds You have answered Yes and I believe you. Take two points, for knowing that I skipped question 14. Good work. You are paying attention. | FX Computer Sounds You have answered No and I cannot give you any points. Please take zero points. For your information, I skipped question 14. That's right, question 14. | FX Computer Sounds It is important that you follow instructions. I skipped question 14, and since you did not know that and you did not follow my instructions, take zero points. | FX Computer Sounds Same as Ch 3 |
| Please hold on for a moment,, I have a fax message coming in (FX-Fax machine) | Same as Ch 1 | Same as Ch 1 | Same as Ch 1 |
| Ah, I have a special interview with one of the best athletes | Same as Ch 1 | Ah, this message is informing me that I have a special interview | Same as Ch 3 |

EAMPLE 8-continued

| QUESTION<br>YES<br>1 | A<br>NO<br>2 | B<br>TRUE<br>3 | C<br>FALSE<br>4 |
|---|---|---|---|
| in the world in my memory banks. If you would like to hear this interview, press Yes. If you would not like to hear this interview, and instead get other questions, press No. Press yes or no NOW. | | with one of the best athletes in the world in my memory banks. If you would like to hear this interview, press Yes. If you would not like to hear this interview, and instead hear other questions, Press No. Press yes or no NOW. | |
| FX Computer Sounds | FX Computer Sounds | FX Computer Sounds | FX Computer Sounds |

Although the present invention has been described in detail with respect to certain embodiments and examples, variations and modifications exist which are within the scope of the present invention as defined in the following claims, such as using voice response mechanisms or remote control devices to determine which choice has been selected.

What is claimed is:

1. A real-time interactive conversational apparatus which comprises:
   means for removably receiving and selectively playing at least one of a plurality of storage media at a given time, each of said plurality of removably receivable and selectively playable storage media containing a different interactive conversational content and comprising a plurality of temporally related data storage tracks containing information, said means for selectively playing a removably received storage media at said given time comprising means for substantially simultaneously retrieving the information from each of said data storage tracks; and
   multiple choice selection means for randomly accessing one of said tracks of said removably received storage media for retrieving the information stored thereon for enabling said selective playing of said retrieved information, the information being stored on each track in a plurality of information segments, each of said segments comprising a complete message reproducible by said retrieval means directly in response to the selection of the track upon which said segments are stored, each of said information segments comprising interrogatories having multiple choice selectable responses, responsive messages, informational messages, or combinations thereof related in real-time and content to information contained in at least one information segment of at least one track at a prior time, said information stored on said tracks in a predetermined timed sequence according to a decision-tree for providing different interactive pathways through said tracks comprising a continuous flow of interactive conversations across said tracks dependent on said multiple choice selectable responses, each of at least one information segment on each of at least two of said plurality of tracks comprising an interrogatory having multiple choice selectable responses corresponding with associated information segments, said associated information segments comprising responsive messages related in real-time and content to said interrogatory, said correspondence determinable according to said decision-tree, said selecting playing means selectively playing an information segment from said accessed one of said tracks.

2. A real-time interactive conversational apparatus according to claim 1 wherein
   the information on at least one of said data storage tracks comprises combinations of interrogatories and responsive messages.

3. A real-time interactive conversational apparatus according to claim 1 wherein
   at least one of said pathways comprises a special pathway, said information segments along said special pathway recalling the content of at least a portion of the prior information segments along said special pathway, for exhibiting a pseudo-memory of at least a portion of said multiple choice selectable responses.

4. A real-time interactive conversational apparatus according to claim 3 wherein
   more than one of said pathways comprises a special pathway, said information segments along each of said more than one special pathway recalling the content of at least a portion of the prior information segments along said more than one special pathway, said more than one special pathway existing simultaneously on said decision-tree, for simultaneously exhibiting a pseudo-memory of at least a portion of said multiple choice selectable responses for each of said more than one special pathway.

5. A real-time interactive conversational apparatus according to claim 4 wherein
   each special pathway exhibits recall of at least a portion of said multiple choice selectable responses after at least three consecutive interrogatories.

6. A real-time interactive conversational apparatus in accordance with claim 3 wherein at least two of said pathways comprise said special pathways, one of said special pathways corresponding to solely correct responses to a plurality of successive interrogatories, the other of said special pathways corresponding to solely incorrect responses to said plurality of successive interrogatories.

7. A real-time interactive conversational apparatus according to claim 1, wherein
   said temporally related data storage tracks comprise a magnetic storage media having a plurality of coextensive tracks wherein said means for retrieving the information comprises magnetic storage media reading means corresponding with each of said plurality of coextensive tracks.

8. A real-time interactive conversational apparatus in accordance with claim 1 wherein a plurality of said information segments comprise a complete interactive scenario; at least one of said pathways in said decision tree comprising a special logical pathway reserved solely for correct choices comprising said complete interactive scenario, at least one of said information segments along said special logical pathway at a predetermined point in said decision tree after a predetermined number of said multiple choice selectable responses in said complete interactive scenario have occurred providing a responsive message recalling that all of said preceding choices in said complete interactive scenario have been responded to correctly, the other available interactive pathways in said decision tree at said predetermined point providing responsive messages indicative of a failure to correctly respond to all of said preceding choices in said complete interactive scenario; whereby pseudo-memory is provided for said complete interactive scenario.

9. A real-time interactive conversational apparatus in accordance with claim 8 wherein said predetermined number of said multiple choice selectable responses comprises twelve.

10. A real-time interactive conversational apparatus in accordance with claim 8 wherein said decision tree comprises further interactive pathways beyond said predetermined point for extending said complete interactive scenario from said special logical pathway for providing subsequent multiple choice selectable responses in said extended complete interactive scenario as a reward for being on said special logical pathway at said predetermined point, said special logical pathway being extended in said decision tree from said predetermined point for correct choices to said subsequent multiple choice selectable responses; whereby said pseudo-memory may be extended to the end of said complete interactive scenario.

11. A real-time interactive conversational apparatus in accordance with claim 1 wherein at least two of said interactive pathways in said decision tree at a first predetermined point in said decision tree correspond to information segments for providing a different code word message associated with each of said two interactive pathways for subsequent use at a second predetermined point in said decision tree, said multiple choice selectable responses available at said second predetermined point in said decision tree being dependent on recollection of said previously provided code word; whereby said code word may be employed to provide long term memory capabilities.

12. A real-time interactive conversational apparatus in accordance with claim 1 wherein a plurality of multiple choice selectable responses share a common data storage track while a plurality of multiple choice selectable responses to a preceding interrogatory are simultaneously being provided on a plurality of other data storage tracks for providing a greater number of selectable choices than the number of available data storage tracks.

13. In an improved real-time interactive conversational apparatus having a magnetic storage media having a plurality of coextensive audio tracks having audio information stored thereon for audio playback therefrom;

a multi-track audio playback means for simultaneously obtaining said stored audio information from each of said coextensive tracks;

multiple choice selection means operatively connected to said playback means for directly selecting one of said tracks for selectively playing the information stored thereon;

and audio output means operatively connected to said playback means and said direct selection means for directly providing said selected track information from said simultaneously obtained stored audio information for selectively reproducing said information as an audio output therefrom, said information being stored on each track in a plurality of reproducible information segments, each of said segments comprising a complete message reproducible by said playback means directly in response to the selection of said track upon which said segments are stored;

wherein the improvement comprises:

means for removably receiving at least one of a plurality of said storage media, each of said removably receivable storage media containing a different interactive conversational content, the stored information on each of the tracks of said removably receivable storage media capable of comprising interrogatories having multiple choice selectable responses, responsive messages, informative messages or combinations thereof, said information stored on said tracks in a predetermined timed sequence according to a decision-tree to allow a track invariant continuous flow of interactive conversation responsive to said multiple choice selectable responses, and each of at least one information segment on at least two of said plurality of tracks comprises a particular interrogatory having multiple choice selectable responses corresponding with respective associated information segments, said respective associated information segments comprising responsive messages related in real-time and content to said particular interrogatory, said correspondence determinable according to said decision-tree.

14. A method for providing a real-time interactive conversation which comprises providing a magnetic storage media having plurality of coextensive audio tracks having audio information stored thereon for audio playback therefrom;

providing a multi-track audio playback means for simultaneously obtaining said stored audio information from each of said coextensive tracks, said playback means removably receiving one of a plurality of said storage media, each of said storage media containing a different interactive conversational content;

providing multiple choice selection means operatively connected to said playback means for directly selecting one of said tracks for reproducing said selected information stored thereon;

providing audio output means operatively connected to said playback means and said direct selection means for reproducing said selected information on a selected track as an audio output therefrom;

storing said information on said tracks in a predetermined timed sequence following a decision-tree relationship to allow a track invariant continuous flow of interactive conversation responsive to multiple choice selectable responses to interrogatories contained in said information, said multiple choice selectable responses corresponding with associated tracks, said decision-tree including a pathway containing a series of interrogatories, each interrogatory having a correct multiple choice response and at least one incorrect multiple choice response, said pathway followable only by multiple choice selection of the correct response to a particular interrogatory on said series of interrogatories;

determining from said decision-tree when a plurality of said series of interrogatories have been correctly responded to;

providing messages along said pathway, said messages having a differing content corresponding with the number of correct responses to said plurality of interrogatories; and playing back said magnetic storage media, said audio output means reproducing the information on tracks associated with the multiple choice responses to said interrogatories.

15. A method for providing real-time interactive conversation in accordance with claim 14 wherein a plurality of said information segments comprise a complete interactive scenario, said method further comprising:

providing a special logical pathway in said decision tree reserved solely for correct choices comprising said complete interactive scenario;

providing as at least one of said information segments along said special logical pathway at a predetermined point in said decision tree after a predetermined number of said multiple choice selectable responses in said complete interactive scenario have occurred a responsive message recalling that all of said preceding choices in said complete interactive scenario have been responded to correctly, providing as the other available interactive pathways in said decision tree at said predetermined point responsive messages indicative of a failure to correctly respond to all of said preceding choices in said complete interactive scenario;

whereby pseudo-memory is provided for said complete interactive scenario.

16. A method for providing a real-time interactive conversation in accordance with claim 14 further comprising providing said decision tree with further interactive pathways beyond said predetermined point for extending said complete interactive scenario from said special logical pathway for providing subsequent multiple choice selectable responses in said extended complete interactive scenario as a reward for being on said special logical pathway at said predetermined point, said special logical pathway being extended in said decision tree from said predetermined point for correct choices to said subsequent multiple choice selectable responses; whereby said pseudo-memory may be extended to the end of said complete interactive scenario.

17. A method for providing a real-time interactive conversation in accordance with claim 14 further comprising providing at least two of said interactive pathways in said decision tree at a first predetermined point in said decision tree corresponding to information segments for providing a different code word message associated with each of said two interactive pathways for subsequent use at a second predetermined point in said decision tree, said multiple choice selectable responses available at said second predetermined point in said decision tree being dependent on recollection of said previously provided code word; whereby said code word may be employed to provide long term memory capabilities.

18. A method for providing a real-time interactive conversation which comprises providing a magnetic storage media having plurality of coextensive audio tracks having audio information stored thereon for audio playback therefrom;

providing a multi-track audio playback means for simultaneously obtaining said stored audio information from each of said coextensive tracks, said playback means removably receiving one of a plurality of said-storage media, each of said storage media containing a different interactive conversational content;

providing multiple choice selection means operatively connected to said playback means and controllable by a child for directly selecting one of said tracks for reproducing said selected information stored thereon;

providing audio output means operatively connected to said playback means and said multiple choice selection means for reproducing said selected information on a selected track as an audio output therefrom;

storing said information on said tracks in a predetermined timed sequence following a decision-tree relationship to allow a track invariant continuous flow of interactive conversation responsive to multiple choice selectable responses to interrogatories contained in said information, said multiple choice selectable responses corresponding with associated tracks, said decision-tree comprising at least one special pathway, corresponding to a series of particular multiple choice responses to a series of particular interrogatories, information segments along said special pathway capable of recalling the content of at least a portion of the prior information segments along said special pathway, so as to exhibit a pseudo-memory of at least a portion of said particular multiple choice responses;

storing on said tracks in a timed relationship at least a plurality of interrogatories with respective multiple choice responses, said interrogatories and respective multiple choice responses related according to said decision tree to form a special pathway, the content of at least a portion of said related interrogatories each having a differing content corresponding with the content of at least a portion of said memory of multiple choice responses;

playing back said magnetic storage media, said audio output means reproducing the information on tracks associated with the multiple choice responses to said interrogatories, said playback means providing interactive conversation and exhibiting said pseudo-memory in response to multiple choice selections corresponding to said series of particular responses associated with said at least one special pathway.

* * * * *

UNITED STATES PATENT AND TRADEMARK OFFICE
CERTIFICATE OF CORRECTION

PATENT NO. : 5,340,317

DATED : August 23, 1994

INVENTOR(S): Michael J. Freeman

It is certified that error appears in the above-identified patent and that said Letters Patent is hereby corrected as shown below:

Claim 13, line 31: delete "capable of".

Signed and Sealed this

Twenty-fifth Day of October, 1994

Attest:

BRUCE LEHMAN

Attesting Officer

Commissioner of Patents and Trademarks